(12) United States Patent
Shimada et al.

(10) Patent No.: US 9,294,684 B2
(45) Date of Patent: Mar. 22, 2016

(54) PHOTOGRAPHING APPARATUS CAPABLE OF FLASH LIGHT EMISSION

(71) Applicant: Olympus Corporation, Shibuya-ku, Tokyo (JP)

(72) Inventors: Yoshinao Shimada, Hino (JP); Keiji Kunishige, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/444,417

(22) Filed: Jul. 28, 2014

(65) Prior Publication Data

US 2014/0333827 A1    Nov. 13, 2014

Related U.S. Application Data

(63) Continuation of application No. 13/012,174, filed on Jan. 24, 2011, now Pat. No. 8,817,173.

(30) Foreign Application Priority Data

Feb. 1, 2010   (JP) ................................ 2010-020163
May 28, 2010  (JP) ................................ 2010-122363

(51) Int. Cl.
*H04N 5/222*       (2006.01)
*H04N 5/235*       (2006.01)
*G03B 15/05*       (2006.01)

(52) U.S. Cl.
CPC .............. *H04N 5/2354* (2013.01); *G03B 15/05* (2013.01); *H04N 5/222* (2013.01); *H04N 5/2353* (2013.01)

(58) Field of Classification Search
None
See application file for complete search history.

(56) References Cited

U.S. PATENT DOCUMENTS 6,359,651 B1 * 3/2002 Yokonuma ........... H04N 5/2354
                                                    348/229.1
7,092,029 B1 * 8/2006 Medwick ............. H04N 5/2354
                                                    348/229.1

(Continued)

FOREIGN PATENT DOCUMENTS

JP           2003172970 A  *  6/2003  ............. G03B 15/05

OTHER PUBLICATIONS

Title: Translation of JP 2003-172970 Author: Higaki, Riichi Date: Jun. 2003.*

(Continued)

*Primary Examiner* — Twyler Haskins
*Assistant Examiner* — Wesley J Chiu
(74) *Attorney, Agent, or Firm* — John C. Pokotylo; Straub & Pokotylo

(57) ABSTRACT

A photographing apparatus according to the present invention comprises: an accumulation control section controlling an accumulation operation in an imaging section; an accumulation start timing setting section setting a timing of accumulation start in the imaging section; and a flash light emission control section controlling the start and stop of light emission in the flash light emission section, wherein the accumulation control section instructs the flash light emission control section to start the flash light emission and causes the imaging section to start the accumulation based on an output of the accumulation start timing setting section, and the flash light emission control section causes the flash light emission to be started in response to the flash light emission start instruction of the accumulation control section and causes the flash light emission section to stop the light emission based on an appropriate light emission amount output by an exposure calculation section.

8 Claims, 19 Drawing Sheets

(56) References Cited

U.S. PATENT DOCUMENTS

| | | |
|---|---|---|
| 7,230,685 B2 | 6/2007 | Suzuki |
| 7,359,632 B2 * | 4/2008 | Tohyama ............... G03B 15/05 315/241 P |
| 7,379,115 B2 * | 5/2008 | Ichikawa ............. H04N 5/2351 348/370 |
| 7,990,431 B2 * | 8/2011 | Hsieh .................... G03B 15/05 348/224.1 |
| 2004/0109082 A1 * | 6/2004 | Yokonuma ........... H04N 5/2352 348/371 |
| 2009/0123143 A1 * | 5/2009 | Tamura .................. G03B 15/05 396/164 |

OTHER PUBLICATIONS

Notice of Rejection in corresponding Chinese Patent Application Serial No. 201310319487.5, mailed Nov. 3, 2014 (6 pgs.).

* cited by examiner

FIG. 7

| INTERVAL CLASSFICATION | | INTERVAL 1 | INTERVAL 2 | INTERVAL 3 | INTERVAL 4 | INTERVAL 5 |
|---|---|---|---|---|---|---|
| NAME | SYMBOL | LIGHT EMISSION DELAY INTERVAL | LIGHT EMISSION RISE INTERVAL | LIGHT EMISSION PEAK INTERVAL | LIGHT EMISSION ATTENUATION INTERVAL 1 | LIGHT EMISSION ATTENUATION INTERVAL 2 |
| INTERVAL($\mu s$) | t_interval | 10 | 30 | 5 | 100 | 70 |
| TIME FROM LIGHT EMISSION START($\mu s$) | t_interval_sum | 10 | 40 | 45 | 145 | 215 |
| LIGHT EMISSION STRENGTH CHANGE RATE (LIGHT EMISSION AMOUNT/$s^2$) | $\Delta L / \Delta s$ | 0 | 0.5 | 0 | -0.1 | -0.05 |
| LIGHT EMISSION STRENGTH AT ANY POINT IN INTERVAL (LIGHT EMISSION AMOUNT/s) | L | 0 | 0.5 * tx (VARIABLE WITHIN INTERVAL) | 0.5 * 30 | 0.5 * 30 + (-0.1) * (tx) (VARIABLE WITHIN INTERVAL) | 0.5 * 30 + (-0.1) * 100 + (-0.05) * (tx) (VARIABLE WITHIN INTERVAL) |
| LIGHT EMISSION STRENGTH AT START POINT OF EACH INTERVAL (LIGHT EMISSION AMOUNT/s) | L_start | 0 | 0 | 15 | 15 | 5 |
| LIGHT EMISSION STRENGTH AT END POINT OF EACH INTERVAL (LIGHT EMISSION AMOUNT/s) | L_last | 0 | 15 | 15 | 5 | 1.5 |
| LIGHT EMISSION AMOUNT IN EACH INTERVAL (LIGHT EMISSION AMOUNT) | L·t | 0 | 225 | 75 | 1000 | 227.5 |
| TOTAL LIGHT EMISSION AMOUNT (LIGHT EMISSION AMOUNT) | L·t_sum | 0 | 225 | 300 | 1300 | 1528 |

Tx CORRESPONDS TO ELAPSED TIME FROM START OF EACH INTERVAL. THIS ALWAYS TAKES SMALLER VALUE THAN THAT OF EACH INTERVAL. FIG. 8 EXPLICITLY SHOWS MEANING OF tx IN INTERVAL 4.

FIG. 12

| INTERVAL CLASSIFICATION | | INTERVAL 0 | INTERVAL 1 | INTERVAL 2 | INTERVAL 3 | INTERVAL 4 | INTERVAL 5 |
|---|---|---|---|---|---|---|---|
| NAME | SYMBOL | NON-LIGHT-EMISSION INTERVAL | LIGHT EMISSION DELAY INTERVAL | LIGHT EMISSION RISE INTERVAL | LIGHT EMISSION PEAK INTERVAL | LIGHT EMISSION ATTENUATION INTERVAL1 | LIGHT EMISSION ATTENUATION INTERVAL 2 |
| INTERVAL($\mu s$) | t_interval | $-(\infty)$ | 10 | 30 | 5 | 100 | 70 |
| TIME FROM LIGHT EMISSION START($\mu s$) | t_interval_sum | — | 10 | 40 | 45 | 145 | 215 |
| LIGHT EMISSION STRENGTH CHANGE RATE (LIGHT EMISSION AMOUNT/$s^2$) | $\Delta L/\Delta s$ | 0 | 0 | 0.5 | 0 | -0.1 | -0.05 |
| LIGHT EMISSION STRENGTH AT ANY POINT IN INTERVAL (LIGHT EMISSION AMOUNT/s) | L | 0 | 0 | 0.5 * tx (VARIABLE WITHIN INTERVAL) | 0.5 * 30 | 0.5 * 30 + (-0.1) * (tx) (VARIABLE WITHIN INTERVAL) | 0.5 * 30 + (-0.1) * 100 + (-0.05) * (tx) (VARIABLE WITHIN INTERVAL) |
| LIGHT EMISSION STRENGTH AT START POINT OF EACH INTERVAL (LIGHT EMISSION AMOUNT/s) | L_start | 0 | 0 | 0 | 15 | 15 | 5 |
| LIGHT EMISSION STRENGTH AT END POINT OF EACH INTERVAL (LIGHT EMISSION AMOUNT/s) | L_last | 0 | 0 | 15 | 15 | 5 | 1.5 |
| LIGHT EMISSION AMOUNT IN EACH INTERVAL (LIGHT EMISSION AMOUNT) | L·t | 0 | 0 | 225 | 75 | 1000 | 227.5 |
| TOTAL LIGHT EMISSION AMOUNT (LIGHT EMISSION AMOUNT) | L·t_sum | 0 | 0 | 225 | 300 | 1300 | 1528 |

Tx CORRESPONDS TO ELAPSED TIME FROM START OF EACH INTERVAL. THIS ALWAYS TAKES SMALLER VALUE THAN THAT OF EACH INTERVAL. FIG. 13 EXPLICITLY SHOWS MEANING OF tx IN INTERVAL 4.

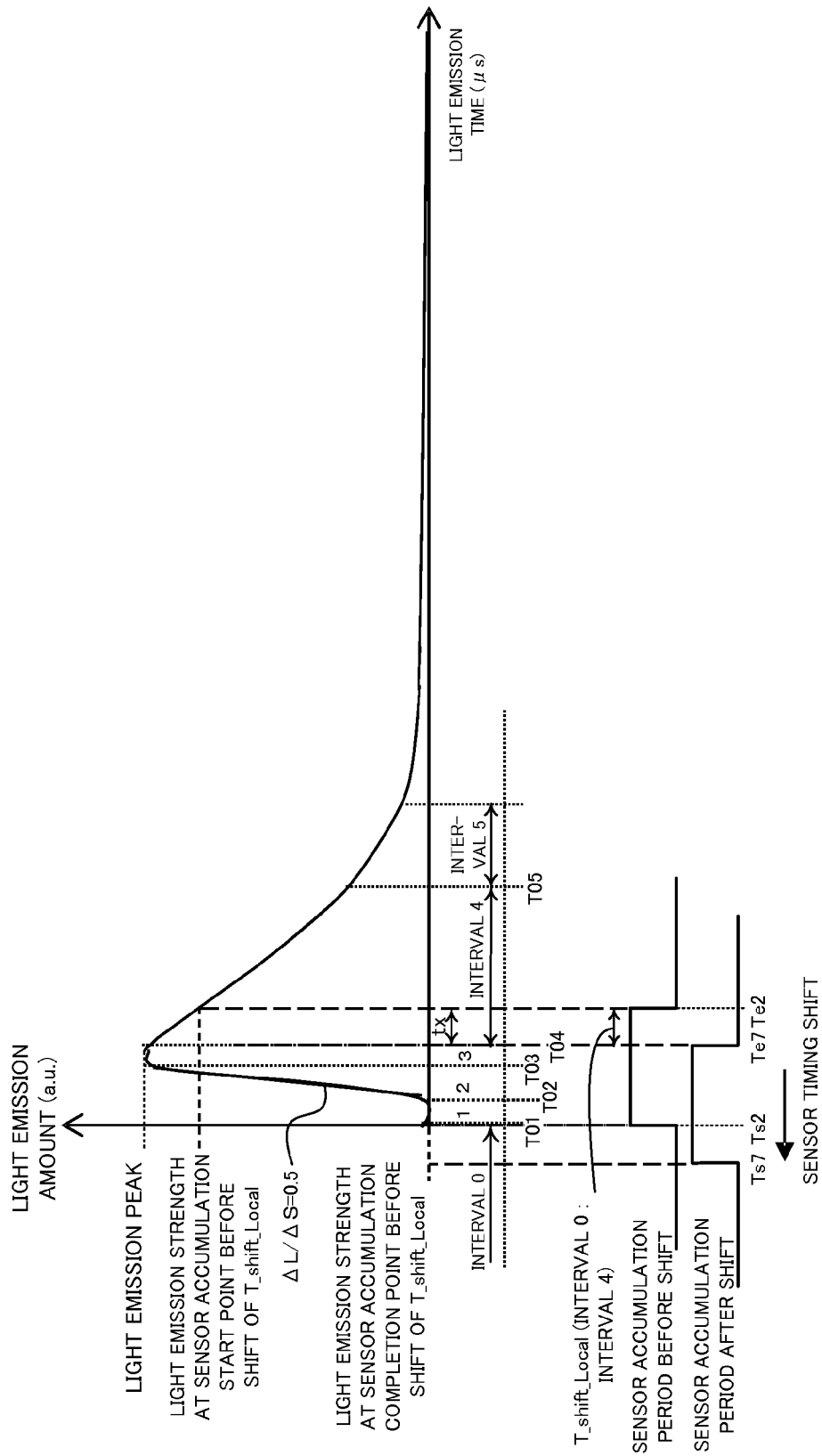

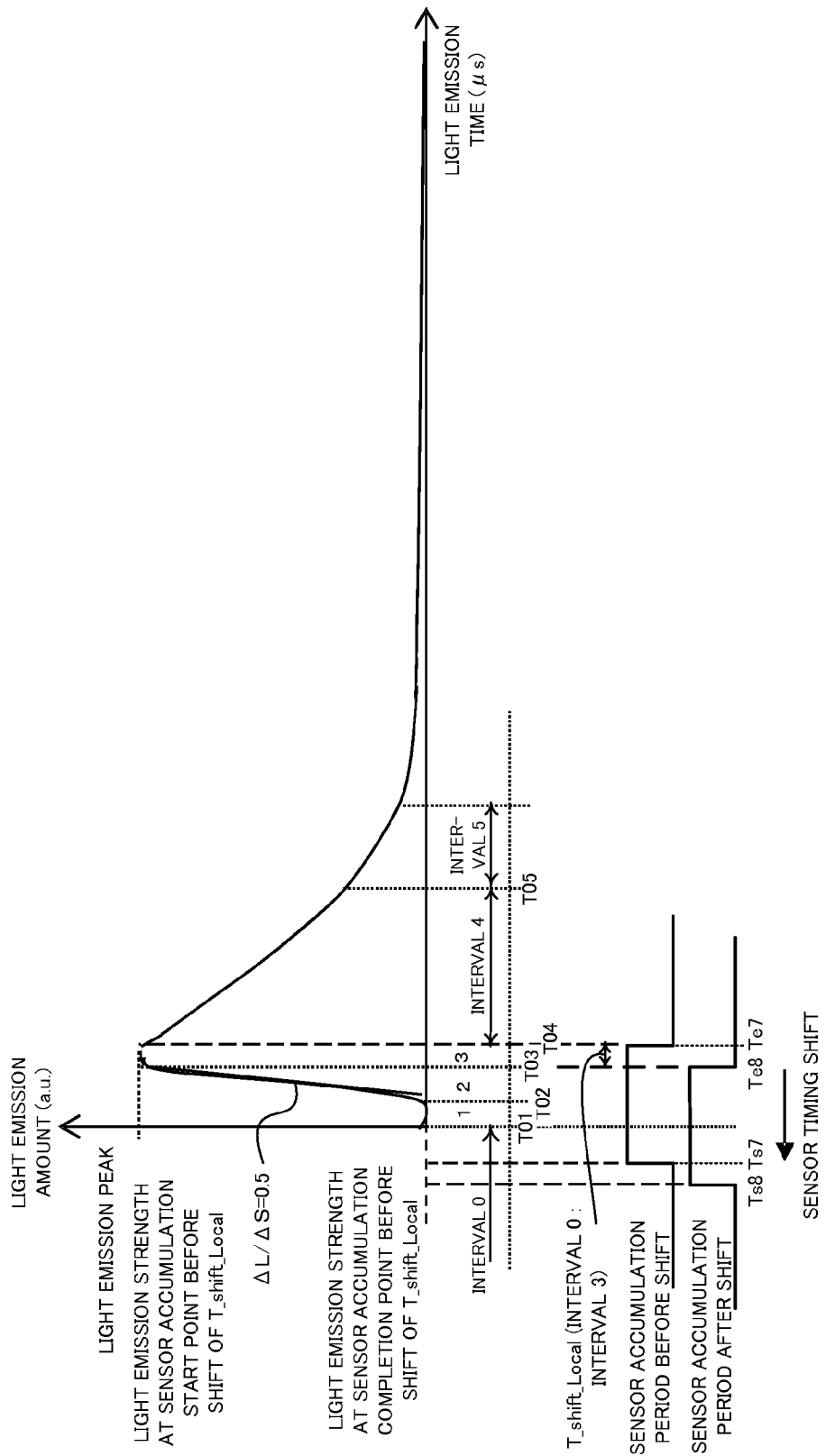

FIG. 18

| No. | LIGHT EMISSION TIME ($\mu$s) | LIGHT EMISSION AMOUNT (a.u.) |
|---|---|---|
| 1 | 24.00 | 1.4 |
| 2 | 25.00 | 1.6 |
| 3 | 26.01 | 1.8 |
| 4 | 26.99 | 2.0 |
| 5 | 27.99 | 2.2 |
| 6 | 29.34 | 2.5 |
| 7 | 30.34 | 2.8 |
| 8 | 31.34 | 3.1 |
| 9 | 32.34 | 3.5 |
| 10 | 33.34 | 3.9 |
| 11 | 34.34 | 4.4 |
| 12 | 35.34 | 5.0 |
| 13 | 36.35 | 5.6 |
| 14 | 37.37 | 6.2 |
| 15 | 38.47 | 7.0 |
| 16 | 39.47 | 7.9 |
| 17 | 40.47 | 8.8 |
| 18 | 41.47 | 9.9 |
| 19 | 42.48 | 11.1 |
| 20 | 43.61 | 12.5 |
| 21 | 44.90 | 14.0 |
| 22 | 46.41 | 15.7 |
| 23 | 48.16 | 17.7 |
| 24 | 50.21 | 19.8 |
| 25 | 52.61 | 22.3 |
| 26 | 55.44 | 25.0 |
| 27 | 58.88 | 28.1 |
| 28 | 63.02 | 31.5 |
| 29 | 68.03 | 35.4 |
| 30 | 74.28 | 39.7 |
| 31 | 82.45 | 44.5 |
| 32 | 94.60 | 50.0 |
| 33 | 112.61 | 56.1 |
| 34 | 147.50 | 63.0 |
| 35 | 211.79 | 70.7 |
| 36 | 388.51 | 79.4 |
| 37 | 851.36 | 89.1 |
| 38 | 1000.00 | 100.0 |

FIG. 19

| No. | LIGHT EMISSION TIME ($\mu$s) | LIGHT EMISSION AMOUNT (a.u.) | LIGHT EMISSION AMOUNT AFTER SHIFT (a.u.) | RATIO IN TABLE AFTER SHIFT |
|---|---|---|---|---|
| 10 | 33.34 | 3.9 | 0.437 | |
| 11 | 34.34 | 4.4 | 0.912 | 2.085 |
| 12 | 35.34 | 5.0 | 1.453 | 1.594 |
| 13 | 36.35 | 5.6 | 2.060 | 1.418 |
| 14 | 37.37 | 6.3 | 2.742 | 1.331 |
| 15 | 38.47 | 7.0 | 3.508 | 1.279 |
| 16 | 39.47 | 7.9 | 4.367 | 1.245 |
| 17 | 40.47 | 8.8 | 5.331 | 1.221 |
| 18 | 41.47 | 9.9 | 6.414 | 1.203 |
| 19 | 42.48 | 11.1 | 7.629 | 1.189 |
| 20 | 43.61 | 12.5 | 8.992 | 1.179 |
| 21 | 44.90 | 14.0 | 10.523 | 1.170 |
| 22 | 46.41 | 15.7 | 12.241 | 1.163 |
| 23 | 48.16 | 17.7 | 14.170 | 1.158 |
| 24 | 50.21 | 19.8 | 16.335 | 1.153 |
| 25 | 52.61 | 22.3 | 18.765 | 1.149 |

PHOTOGRAPHING APPARATUS CAPABLE OF FLASH LIGHT EMISSION

RELATED APPLICATIONS

This application is a continuation application of U.S. patent application Ser. No. 13/012,174 (referred to as "the '174 application" and incorporated herein by reference), filed on Jan. 24, 2011, titled "PHOTOGRAPHING APPARATUS" and listing Yoshinao SHIMADA and Keiji KUNISHIGE as the inventors, the '174 application claiming benefit of Japanese Application Nos. 2010-020163 filed in Japan on Feb. 1, 2010, and 2010-122363 filed in Japan on May 28, 2010, the contents of which are incorporated by this reference.

BACKGROUND OF THE INVENTION

1. Field of the Invention

The present invention relates to a photographing apparatus, and more particularly, relates to a photographing apparatus carrying out photographing in combination with an external flash or a built-in flash.

2. Description of the Related Art

Conventionally, a focal plane shutter is frequently used in a single-reflex camera. When carrying out photographing by using a flash, it is possible to illuminate an object uniformly by flash light emission at the moment when a shutter is fully opened at a shutter speed slower than a shutter speed at which a focal plane shutter is fully open (so-called flash synchronization speed). Furthermore, when carrying out the flash photographing in a shutter speed not slower than the flash synchronization speed, it is possible to illuminate the object uniformly by a light emission method called a flat light emission method in which flash light is continuously emitted to provide an effect similar to that of ambient light (refer to Japanese Patent Application Laid-Open Publication No. 2001-215574 (disclosed on Aug. 10, 2001)).

In the camera performing exposure by using the focal plane shutter, the same shutter speed as a curtain speed of the focal plane shutter, for example, a shutter speed of approximately $1/200$ seconds, is the highest speed of the flash synchronization. Accordingly, when the flash light emission is used in a photographing scene such as day time synchronization, it is necessary to set the shutter speed to be a shutter speed slower than the flash synchronization speed and a photographing condition is restricted. Furthermore, when the flash synchronization is carried out at a high shutter speed by the flat light emission, the cost of the apparatus is considerably increased because of a scale-up of a flash light emission circuit, a higher complexity of light emission control, and the like, and further a light emission amount cannot be increased because the light emission is carried out continuously and a photographing condition is restricted.

Meanwhile, a MOS type imaging element is known to employ a read-out method of a lump shutter (called global shutter) method which makes the exposure periods of all the pixels uniform (refer to Japanese Patent Application Laid-Open Publication No. 2008-28517 (disclosed on Feb. 7, 2008)). When photographing is carried out by the use of an imaging element capable of the read-out of this global shutter method, the shutter speed can be controlled electronically and it is possible to realize a high shutter speed of higher than $1/10000$ seconds, for example. Further, when the photographing is carried out in combination with a flash apparatus, the flash synchronization can be performed in principle even at a high shutter speed such as $1/10000$ seconds.

SUMMARY OF THE INVENTION

The present invention aims for providing a photographing apparatus which is provided with a flash dimming function and capable of efficiently utilizing light emission energy of a flash as well as realizing a higher flash synchronization speed by utilizing an electronic shutter of an imaging element.

A photographing apparatus according to the present invention comprises: an imaging section accumulating photoelectric current according to a received light amount and outputting an image signal according to this accumulated photoelectric current; an accumulation control section controlling an accumulation operation in the imaging section; a flash light emission section illuminating an object by flash light emission; an emitted light waveform storing section storing emitted light waveform information which shows a relationship between a light emission time and a light emission amount in the flash light emission section; an exposure calculation section calculating an accumulation time in the imaging section and a reception light amount of the flash light emission from the flash light emission section by the imaging section; and an accumulation start timing setting section setting a timing of accumulation start in the imaging section from light emission start in the flash light emission section based on an output of the emitted light waveform storing section and the reception light amount of the flash light emission output by the exposure calculation section, wherein the accumulation control section instructs the flash light emission section to start flash light emission and also causes the imaging section to start the accumulation in the flash light emission section based on the accumulation start timing output by the accumulation start timing setting section from the flash light emission start.

A photographing apparatus according to the present invention comprises: an external flash light emission apparatus which is configured to be attachable to the above photographing apparatus and illuminates an object, the external flash light emission apparatus storing emitted light waveform information showing a relationship between a light emission time and a light emission amount of flash light emission; an imaging section accumulating photoelectric current according to a received light amount and outputting an image signal according to this accumulated photoelectric current; an accumulation control section controlling an accumulation operation in the imaging section; a communication section performing communication with the external flash light emission apparatus; an exposure calculation section calculating an accumulation time in the imaging section and a reception light amount of the flash light emission from the external flash light emission apparatus by the imaging section; an accumulation start timing setting section setting a timing of accumulation start in the imaging section from light emission start in the external flash light emission apparatus based on the emitted light waveform information obtained by the communication section through the communication with the external flash light emission apparatus and the reception light amount of the flash light emission output by the exposure calculation section, wherein the accumulation control section instructs the external flash light emission apparatus via the communication section to start the flash light emission and also causes the imaging section to start the accumulation based on the accumulation start timing output by the accumulation start timing setting section from the flash light emission start in the external flash light emission apparatus.

A photographing apparatus according to the present invention comprises: an imaging section accumulating photoelectric current according to a received light amount and outputting an image signal according to this accumulated photoelectric current; an accumulation control section controlling an accumulation operation in the imaging section; a flash light emission section illuminating an object by flash light emission; an emitted light waveform storing section storing emitted light waveform information which shows a relationship between a light emission time and a light emission amount in the flash light emission section; an exposure calculation section calculating an appropriate accumulation time in the imaging section and an appropriate light emission amount in the flash light emission section; an accumulation start timing setting section setting a timing of accumulation start in the imaging section from light emission start in the flash light emission section based on an output of the emitted light waveform storing section and the appropriate light emission amount output by the exposure calculation section; and a flash light emission control section controlling start and stop of the light emission in the flash light emission section, wherein the accumulation control section instructs the flash light emission control section to start flash light emission and causes the imaging section to start the accumulation based on an output by the accumulation start timing setting section, and the flash light emission control section causes the flash light emission to be started in response to the flash light emission start instruction from the accumulation control section and causes the light emission of the flash light emission section to be stopped based on the appropriate light emission amount output by the exposure calculation section.

A photographing apparatus according to the present invention comprises: an external flash light emission apparatus which is configured to be attachable to the above photographing apparatus and illuminates an object, the external flash light emission apparatus storing emitted light waveform information showing a relationship between a light emission time and a light emission amount of flash light emission; an imaging section accumulating photoelectric current according to a received light amount and outputting an image signal according to this accumulated photoelectric current; an accumulation control section controlling an accumulation operation in the imaging section; a communication section performing communication with the external flash light emission apparatus; an exposure calculation section calculating an appropriate accumulation time in the imaging section and an appropriate light emission amount in the external flash light emission apparatus; and an accumulation start timing setting section setting a timing of accumulation start in the imaging section from light emission start in the external flash light emission apparatus based on the emitted light waveform obtained through the communication with the external flash light emission apparatus via the communication section and the appropriate light emission amount output by the exposure calculation section, wherein the accumulation control section instructs the external flash light emission apparatus via the communication section to start the flash light emission and causes the imaging section to start the accumulation based on an output by the accumulation start timing setting section, and the external flash light emission apparatus starts the flash light emission in response to the flash light emission start instruction from the accumulation control section and stops the flash light emission based on the appropriate light emission amount which is output by the exposure calculation section and obtained via the communication section.

BRIEF DESCRIPTION OF THE DRAWINGS

FIG. 7 is a diagram showing flash light emission profile information in a camera according to a first embodiment of the present invention.

FIG. 12 is a diagram showing flash light emission profile information in a camera according to a variation example of a first embodiment of the present invention.

FIG. 13 is a diagram showing a state in which a sensor accumulation timing is shifted with respect to flash light emission in a camera according to a variation example of a first embodiment of the present invention.

FIG. 14 is a diagram showing a state in which a sensor accumulation timing is shifted with respect to flash light emission further from the state of FIG. 13 in a camera according to a variation example of a first embodiment of the present invention.

FIG. 18 is a diagram showing a relationship between a flash light emission time and a light emission amount in a camera according to a second embodiment of the present invention.

FIG. 19 is a diagram showing a relationship between a light emission time after the accumulation start of an imaging element and a light emission amount in a camera according to a second embodiment of the present invention.

DETAILED DESCRIPTION OF THE PREFERRED EMBODIMENTS

Hereinafter, preferred embodiments will be explained by the use of a camera to which the present invention is applied. A camera 100 according to the preferred embodiments of the present invention is a digital camera and, in outline, has an imaging element, converts an object image into image data with this imaging element, and displays the object image on a display section in a live view based on the converted image data. At the time of photographing, a photographer determines a composition and a good photo opportunity while observing the live view display. When released, the camera 100 carries out photographing. At the time of photographing, the camera 100 is capable of flash synchronization photographing and can shift accumulation start of photoelectric conversion current in the imaging element so as to obtain a timing at which flash light emission can be utilized efficiently. The camera 100 subjects the image data obtained at the time of photographing to image processing and records the image data subjected to the image processing in a recording medium (external memory)). The image data recorded in the recording medium can be reproduced and displayed on the display section when a reproduction mode is selected.

Figure 1:
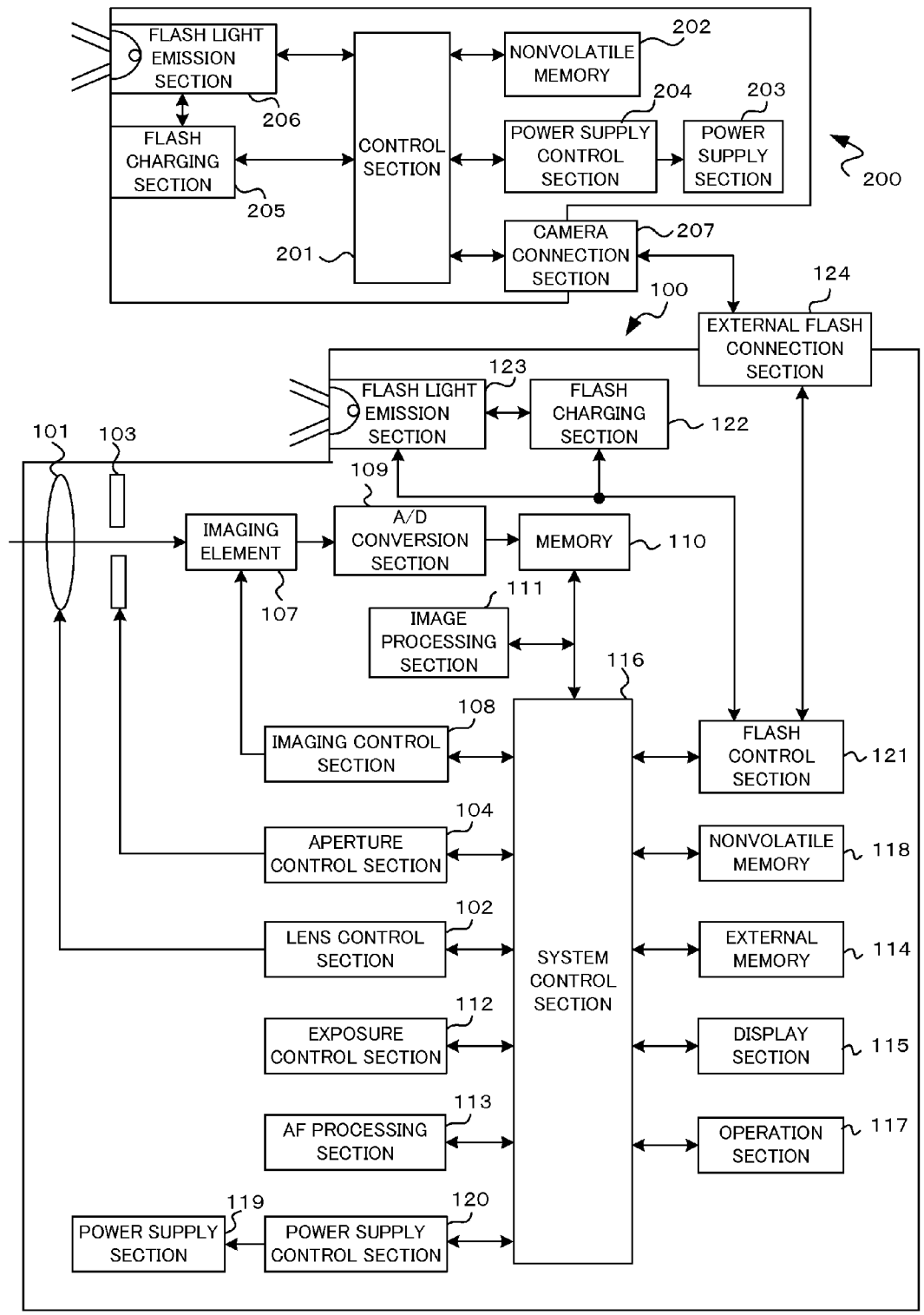
FIG. 1 is a block diagram mainly showing an electrical configuration of a camera according to a first embodiment of the present invention.

FIG. 1 is a block diagram mainly showing an electrical configuration of a photographing apparatus configured with the camera 100 according to a first embodiment of the present invention and an external flash 200. An aperture mechanism 103 and an imaging element 107 are disposed on an optical axis of a photographing lens 101 in this camera 100. An output of the imaging element 107 is connected to an A/D conversion section 109 and an output of the A/D conversion section 109 is connected to a memory 110. The memory 110 is connected to an image processing section 111 and a system control section 116. The system control section 116 is connected with each of an imaging control section 108, an aperture control section 104, a lens control section 102, an exposure control section 112, an AF processing section 113, a flash control section 121, a nonvolatile memory 118, an external memory 114, a display section 115, an operation section 117, and a power supply control section 120.

The above imaging control section 108 is connected to the imaging element 107 and the lens control section 102 is connected to the photographing lens 101. Furthermore, the power supply control section 120 is connected to a power supply section 119. The flash control section 121 is connected to each of a flash charging section 122, a flash light emission section 123, and an external flash connection section 124.

The photographing lens 101 is an optical system for collecting a light flux of the object onto the imaging element 107 and forming an object image. This photographing lens 101 is moved in the optical axis direction to change a focusing state by the lens control section 102 which operates according to an instruction from the system control section 116. The aperture mechanism 103 adjusts an incident amount of an object light flux input into the imaging element 107 via the photographing lens 101. In the aperture mechanism 103, an aperture amount is controlled by the aperture control section 104 which operates according to an instruction from the system control section 116.

The imaging element 107, which has a function of the imaging section, is configured with a color filter which has a Bayer arrangement and is disposed on the front surface thereof, a photoelectric conversion element such as a photodiode arranged corresponding to this color filter, and a charge holding section holding a charge accumulated in this photoelectric conversion element. Each pixel is configured with each of the color filters and corresponding each of the photoelectric conversion elements and an imaging area (pixel section) is configured with a group of the pixels. The pixel section is arranged two-dimensionally in a matrix. The imaging element 107 receives light collected by the photographing lens 101 in each of the pixels, converts the light into a photoelectric current, accumulates this photoelectric current in a condenser (floating diffusion), and outputs the accumulated photoelectric current to the A/D conversion section 109 as an analog voltage signal.

The imaging control section 108, which functions as the accumulation control section together with the system control section 116, performs operation control of the imaging element 107 according to an instruction from the system control section 116. As the operation control, the imaging control section 108 causes the imaging element 107 to start the accumulation of the photoelectric current to the condenser and to finish the accumulation, for example. In particular, when the flash light emission section 123 or 206 is instructed to start flash light emission, the imaging control section 108 causes the imaging element 107 to start the accumulation based on an accumulation start timing output by the system control section 116.

Here, the imaging element 107 of the present embodiment is a CMOS image sensor and has a global shutter function. The global shutter performs the operation of causing all the pixels to start the charge accumulation at the same time and causing all the pixels to finish the charge accumulation at the same time. Note that a rolling shutter, which is to be compared with the global shutter, performs the start and the completion of the charge accumulation at the same timing within a block configured with one to several lines, but has a time difference for read-out among the blocks and performs the shutter operation by performing charge accumulation operation sequentially among the blocks. The imaging control section 108 controls the imaging section so as to cause the accumulation to be finished in the plural pixels of the pixel section at the same time in a unit of all the pixels for the case of the global shutter and in a unit of the block for the case of the rolling shutter, by an instruction of charge accumulation termination.

The A/D conversion section 109 converts an analog image signal output by the imaging element 107 into a digital image signal (image data). The memory 110 is a storage section temporarily storing various kinds of data such as the image data obtained in the A/D conversion section 109 and image data subjected to processing in the image processing section 111. Note that, in the present specification, not only a signal subjected to the A/D conversion by the A/D conversion section 109 but also a signal subjected to the image processing is referred to as the image data if the signal is based on the analog image signal output by the imaging element 107.

The image processing section 111 reads out the image data temporarily stored in the memory 110 and subjects this image data to image processing such as white balance correction processing, demosaicing processing, and color conversion processing. Furthermore, the image processing section 111 performs image compression when storing the image data into the external memory 114 to be described below, and performs decompression of the image data read out from the external memory 114.

The exposure control section 112, which functions as the exposure calculation section together with the system control section 116, calculates an object luminance (luminance of a scene including an object) using the image data temporarily stored in the memory 110. Note that the object luminance obviously may be calculated by the use of a dedicated photometric sensor.

The AF (Auto Focus) processing section 113 extracts a high frequency component signal from the image data temporarily stored in the memory 110 and obtains a focus evaluation value by AF integral processing. The system control section 116 performs drive control so as to cause the photographing lens 101 to be set at a focus position based on the focus evaluation value through the lens control section 102. Note that the AF processing section 113 obviously may be provided with a dedicated sensor such as a TTL phase difference AF sensor and obtain a focus shift amount of the photographing lens 101 based on an output of this dedicated sensor.

The external memory 114 is a recording medium detachable from a camera body, for example, and records the image data compressed in the image processing section 111 and accompanying data thereof. Note that the recording medium for recording the image data and the like may be not only the external memory detachable from the camera body but also a recording medium such as a hard disk built in the camera body.

The display section 115 has a display such as a liquid crystal monitor or an organic EL, disposed on the rear side of the camera body or the like, and provides a live view display based on the image data. Further, the display section 115 performs the reproduction and display of a photographed image recorded in the external memory 114 and further displays a menu screen for displaying an exposure control value and the like and for setting a photographing mode and the like.

The system control section 116, which functions as the exposure calculation section, the accumulation start timing setting section, and the accumulation control section, is configured with an ASIC including a CPU and the like and controls various sequences of the camera 100 such as those of the imaging control section 108 and the flash control section 121 in an integrated manner. Furthermore, the system control section 116 calculates an accumulation time in the imaging element 107 and a reception light amount in the imaging element 107 from the flash light emission of the flash light emission section 123 or 206. Moreover, the system control section 116 sets an accumulation start timing in the imaging element 107 from light emission start in the flash light emission section 123 or 206 based on an output by the nonvolatile memory 118 or 202 and the calculated reception light amount of the flash light emission.

The operation section 117 is configured with operation members such as a power button, a release button, and various input keys. When a user operates any of operation members in the operation section 117, the system control section 116 performs various kinds of sequences corresponding to the user's operation.

The power button in the operation section 117 is an operation member for instructing the power supply in the camera 100 to be turned on or off, and the system control section 116 turns on the power supply when the power button is pressed and turns off the power supply when the power button is pressed again. The release button has a two-stage switch including a first release switch and a second release switch. The release button is half-pressed, the first release switch is turned on and when the release button is pressed further from a half pressed state to be fully pressed, the second release switch is turned on. When the first release switch is turned on, the system control section 116 carries out a photographing preparation sequence such as AE processing and AF processing. Further, when the second release switch is turned on, the system control section 116 executes a photographing sequence to perform photographing. The user can set a photographing condition at the time of the photographing by using the menu screen displayed on the display section 115 and by operating the input key of the operation section 117.

The nonvolatile memory 118 is an electrically rewritable nonvolatile memory and stores various kinds of parameter necessary for the operation of the camera 100. Furthermore, the nonvolatile memory 118 also stores a program to be executed in the system control section 116. According to the program stored in the nonvolatile memory 118, the system control section 116 reads a parameter stored in the nonvolatile memory 118 and executes the various kinds of sequence. Moreover, the nonvolatile memory 118 functions as the emitted light waveform storing section and stores emitted light waveform information showing a relationship between a light emission time and a light emission amount in the flash light emission section 123.

The power supply section 119 supplies electric power necessary for the operation in each part in the camera 100 and is configured with a power supply battery such as a secondary battery, for example. The power supply control section 120 performs the control of the power supply section 119 including the detection of a power supply voltage and a remaining amount in the battery configuring the power supply section 119 and the like.

The flash control section 121 functions as the flash light emission control section and controls charging operation in the flash charging section 122 and controls the light emission operation of flash light emission start and stop in the flash light emission section 123 according to an instruction from the system control section 116. The flash charging section 122 has a booster circuit increasing the power supply voltage of the power supply section 119 and a condenser accumulating energy with the voltage boosted there, and accumulates energy necessary for performing the light emission in the flash light emission section 123. The flash light emission section 123 is provided with a light emission tube such as an xenon (Xe) tube, for example, and a reflection umbrella and emits light by utilizing the energy accumulated in the condenser in the flash charging section 122 when having received an light emission instruction from the flash control section 121. The flash light emission section 123, the flash control section 121, and the flash charging section 122 have a function of the flash light emission section in the camera body.

Furthermore, the flash control section 121 is connected to the external flash connection section 124 and connected to an external flash 200 via this external connection section 124. The external flash connection section 124 functions as the communication section, includes a hot shoe and a communication contact provided in the exterior of the camera 100, and can attach the external flash 200 to the camera 100 detachably. When the external flash 200 is attached to the camera 100, the flash control section 121 of the camera 100 and a control section 201 in the external flash 200 are connected with each other in a communication capable manner.

The external flash 200 is configured with the control section 201, a nonvolatile memory 202, a power supply section 203, a power supply control section 204, a flash charging section 205, a flash light emission section 206, and a camera connection section 207. This external flash 200 functions also as the flash light emission section. The control section 201 is configured with an ASIC including a CPU and the like and controls various kinds of sequences in the external flash 200 in an integrated manner according to a program stored in the nonvolatile memory 202 and control signals from the system control section 116 and the flash control section 121 in the camera 100.

The nonvolatile memory 202 is an electrically rewritable nonvolatile memory and stores various kinds of parameter and information necessary for the operation of the external flash, in addition to the above described control program of the control section 201. As the various kinds of parameters and information, the nonvolatile memory 202 stores various kinds of parameters and information such as a guide number of the external flash 200 and emitted light waveform information showing a relationship between light emission time and a light emission amount, for example. That is, the nonvolatile memory 202 functions also as the emitted light waveform storing section in the same way as the nonvolatile memory 118 and stores the emitted light waveform information showing the relationship between a light emission time and a light emission amount of the flash light emission section 206. The power supply section 203 is a power supply supplying electric power necessary for the operation of each part in the external flash 200 and the power supply control section 204 performs various kinds of controls such as boost control in the power supply section 203.

The flash charging section 205 boosts a power supply voltage supplied by the power supply section 203 and accumulates energy necessary for the light emission of the flash light emission section 206. Typically, an external flash apparatus is configured to be capable of emitting light in a larger light amount than a flash apparatus built in a camera. Accordingly, the flash charging section 205 uses a condenser having a larger capacity than the condenser of the flash charging section 122.

The flash light emission section 206 emits light utilizing the energy accumulated in the condenser in the flash charging section 205 when having received a light emission instruction from the control section 201. This flash light emission section 206 is also configured with a light emission tube such as a xenon (Xe) tube and a reflection umbrella in the same way as the flash light emission section 123. Further, the flash light emission section 206 stops the flash light emission when a light emission stop instruction is input from the control section 201.

The camera connection section 207 is provided in the exterior of the external flash 200, has a leg part attachable to the hot shoe of the camera 100, and is connected to the external flash connection section 124 of the camera 100 as described above via a communication contact provided in this leg part.

Figure 2:
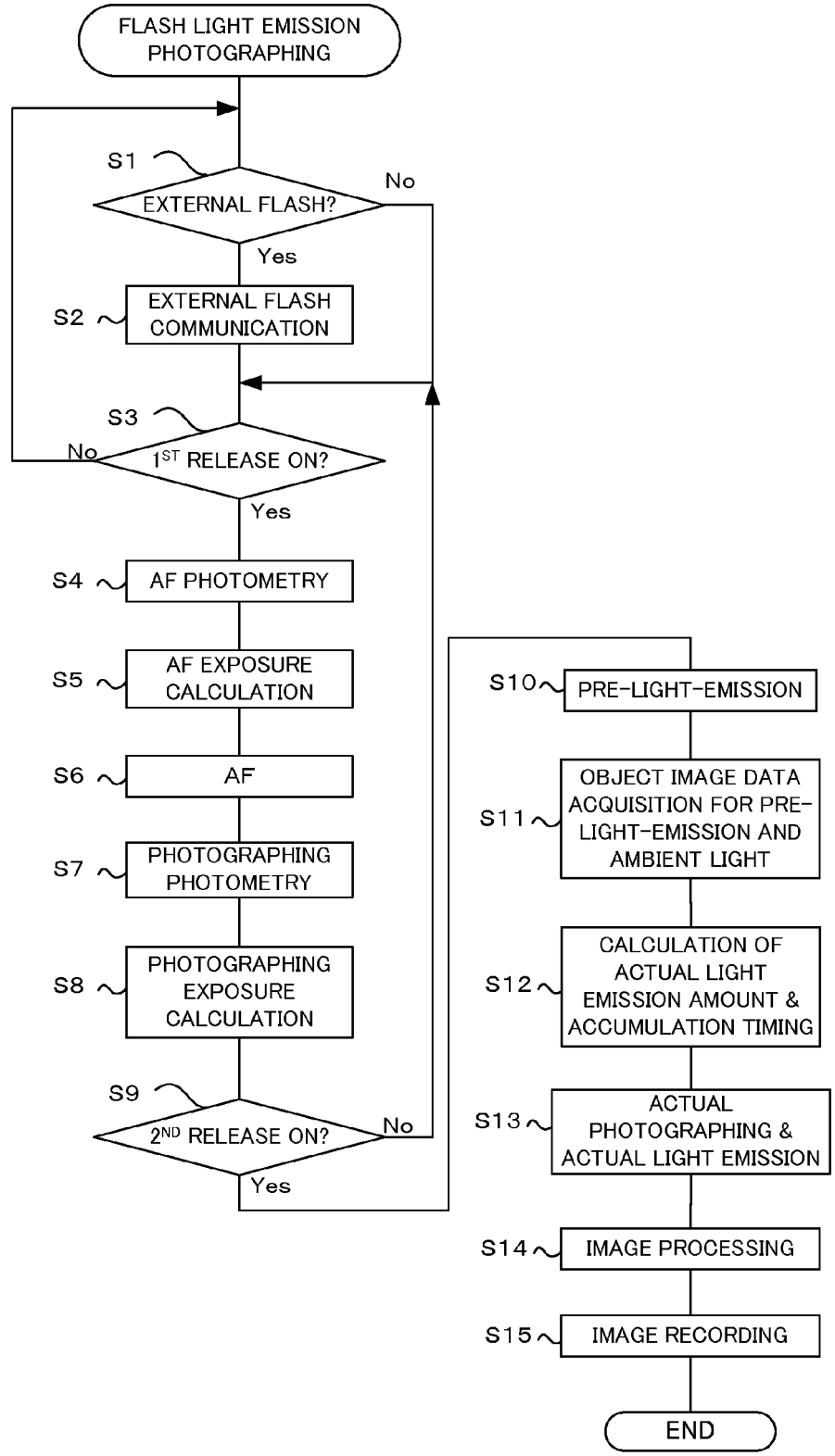
FIG. 2 is a flowchart showing a flash light emission photographing operation of a camera according to a first embodiment of the present invention.

Next, a flash light emission operation by the camera 100 and the external flash 200 shown in FIG. 1 will be explained by the use of a flowchart shown in FIG. 2. Note that this flowchart is carried out by the system control section 116 in the camera 100.

The flow of the flash light emission operation is carried out in a state activated by the turning-on of the power button of the camera 100. First, it is determined whether the external flash 200 is attached or not (S1). Here, the system control section 116 performs transmission to the external flash 200 via the flash control section 121 and determines that the external flash 200 is attached if a response comes from the external flash 200.

If the external flash 200 is attached in the determination result of Step S1, communication with the external flash is performed subsequently (S2). Here, the system control section 116 receives information of the external flash 200 such as a guide number, a charge state, emitted light waveform information showing a relationship between a light emission time and a light emission amount.

After the communication with the external flash 200 in Step S2, or when the external flash 200 is not attached in the determination result of Step S1, it is determined subsequently whether the first release switch is turned on or not (S3). Since a photographer half-presses the release button in a preparation step before photographing, in this step, the determination is performed through the operation section 117 based on a state of the first release switch which is operated in conjunction with the half-press of the release button. If the first release switch is not turned on in this determination result, the system control section 116 returns to Step S1 and carries out the above-described processing repeatedly until the first release switch is turned on.

Meanwhile, if the first release switch is turned on in the determination result of Step S3, AF photometry is performed subsequently (S4). Here, the system control section 116 obtains a luminance value based on image data from the imaging element 107 through the exposure control section 112. This AF photometry, which carries out AF processing in Step S6 to be described below, is performed for determining exposure in the imaging element 107 when an image is obtained for the AF processing.

Subsequently, AF exposure calculation is performed (S5). Here, the system control section 116 performs the AF exposure calculation such as a shutter speed of an electronic shutter in the imaging element 107 based on the AF luminance value obtained in Step S4. After the AF exposure calculation, AF processing is carried out subsequently (S6). Here, the system control section 116 obtains a focus evaluation value through the AF processing section 113 and performs drive control so that the photographing lens 101 is set at a focus position through the lens control section 102 based on this focus evaluation value.

After the AF processing, photographing photometry is performed subsequently (S7). Here, the system control section 116 calculates an object luminance based on the image data from the imaging element 107 in the exposure control section 112. Photographing exposure calculation is performed subsequently (S8). Here, the system control section 116 calculates an aperture value of the aperture 103 which provides appropriate exposure at the time of photographing, and an exposure control value such as an electronic shutter speed of the imaging element 107. In the present embodiment, the camera 100 does not have a mechanically operating shutter and the operation of the shutter is performed by the control of a time during which the photoelectric current output by the photoelectric conversion element in the imaging element 107 is accumulated. While this exposure control value may be calculated by the apex calculation, the aperture value and the shutter speed value are obtained based on the object luminance with reference to a table of the aperture value and the electronic shutter speed preliminarily stored in the nonvolatile memory 118.

After the photographing exposure calculation, it is determined subsequently whether the second release switch is turned on or not (S9). Since the photographer decides a composition while observing a live view display and presses the release button fully at a shutter chance, the determination in this step is performed through the operation section 117 based on a state of the second release switch which operates in conjunction with the full press of the release button. If the second release switch is not turned on in this determination result, the system control section 116 returns to Step S3 and performs the above described processing repeatedly until the second release switch is turned on, to thereby allow the AF and the photometry to follow the change of the object.

Meanwhile, if the second release switch is turned on in the determination result of Step S9, the system control section 116 performs actual photographing which records the image data obtained by the imaging element 107 into the external memory 114, in Step S10 and the succeeding steps. In order to determine an actual light emission amount of the external flash 200 in the actual photographing, the system control section 116 performs pre-light-emission first (S10). Here, the system control section 116 causes the flash light emission section 206 to emit light in a small light amount through the flash control section 121 and the control section 201.

After the pre-light-emission, object image data is subsequently obtained under the pre-light emission and ambient light (S11). Here, the system control section 116 obtains image data of the object image (pre-light-emission data) based on reflected light from the object, in the imaging element 107 when the pre-light-emission is performed in Step S10, and also obtains image data of the object image under an ambient light state (ambient light data) in the imaging element 107. The image data in the ambient light state is obtained after the finish of the pre-light-emission in the present embodiment, but the image data may be obtained in the ambient light state immediately before the pre-light-emission.

Next, the calculation of an actual light emission amount and an accumulation timing is performed subsequently (S12). Here, the system control section 116 determines a light emission amount (actual light emission amount) of the flash light emission section 206 for the actual light emission by using the ambient light data and the pre-light-emission data obtained in Step S11. That is, the system control section 116 calculates an actual light emission amount of the flash light emission section 206 at the time of photographing from a difference between the object luminance obtained from the pre-light-emission data and the object luminance obtained from the ambient light data.

Further, the system control section 116 also performs the calculation of the accumulation timing in Step S12. When the electronic shutter speed for the photographing calculated in Step S8 is high, the accumulation time for the photoelectric current in the imaging element 107 is short compared with the light emission time of the external flash 200 and thus the utilization efficiency of the flash light emission becomes low when accumulation start is performed at the same time as the output timing of a light emission start signal to the external flash 200. Accordingly, in the present embodiment, the system control section 116 obtains an accumulation start timing when the photoelectric current output by each pixel is started to be accumulated, for allowing the light emission energy of the flash to be efficiently utilized.

In obtaining the accumulation start timing in the imaging element 107, the system control section 116 obtains an accumulation timing by which a required light amount can be received most appropriately in the actual light emission, by using the emitted light waveform information showing a relationship between a light emission time and a light emission amount, stored in the nonvolatile memory 202. A detailed method for obtaining this accumulation timing will be described by the use of FIG. 3 to FIG. 16. The actual light emission amount data and the accumulation timing obtained in this step are transmitted to the control section 201 of the external flash 200 via the external flash connection section 124 and the camera connection section 207. The external flash 200 performs the control of the actual light emission amount to be described below by using these received actual light emission data and the accumulation timing.

After having finished the calculation of the actual light emission amount and the accumulation timing, actual photographing and actual light emission are performed subsequently (S13). Here, the system control section 116 drives the aperture mechanism 103 by controlling the aperture control section 104 according to the aperture value calculated in Step S8 and causes the flash light emission section 206 of the external flash 200 to emit light in a light emission amount calculated in Step S12.

Furthermore, the system control section 116 controls the imaging control section 108 and starts the accumulation of the photoelectric current of the imaging element 107 according to the accumulation timing calculated in Step S12 and completes the accumulation at the time when an accumulation time has elapsed based on the electronic shutter speed calculated in Step S8. Note that the sensitivity of the imaging element 107 is set in accordance with the object luminance, for example.

When the actual photographing and the actual light emission have finished, image processing is performed subsequently (S14). Here, the system control section 116 controls the imaging control section 108 and reads out the image signal from the imaging element 107 and causes the image processing section 111 to perform the image processing after having subjected the read-out image signal to A/D conversion.

After the image processing, image recording is performed subsequently (S15). The system control section 116 causes the external memory 114 to record the compressed image data which has been subjected to the image processing by the image processing section 111. After the image recording, the system control section 116 terminates the process of the flash light emission photographing.

Figure 3:
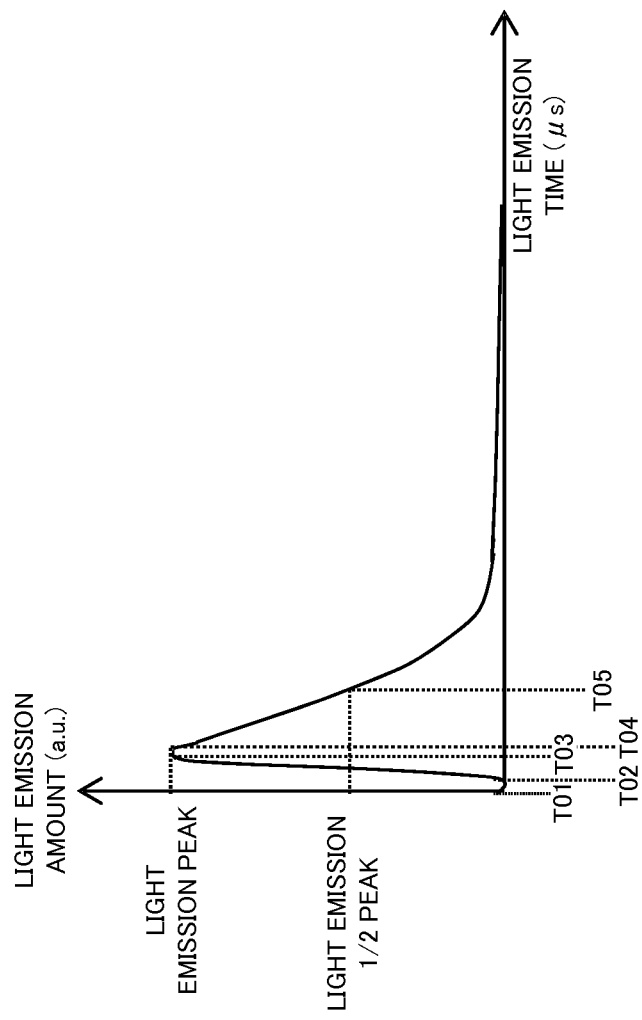
FIG. 3 is a diagram showing a flash light emission profile of a camera according to a first embodiment of the present invention.

Next, a method of deciding the accumulation time in the imaging element will be explained for the flash light emission of the present embodiment by the use of FIG. 3 to FIG. 11. A flash light emission profile, which is information of an emitted light waveform showing a relationship between a light emission time and a light emission amount of the flash, can be analyzed by dividing the profile into plural intervals. FIG. 3 shows a light emission profile when the horizontal axis shows a light emission time (unit: μs) and the vertical axis shows a light emission amount (unit: a.u.).

Time T0 indicates a timing when the flash control section 121 outputs a light emission trigger signal to the external flash 200 and time T0 is time after a light emission delay interval. This light emission delay interval occurs according to a delay time which is mainly caused in a light emission trigger circuit within the flash light emission section 206 or according to a light emission activation delay time or the like caused in a light emission loop of a xenon tube and a main condenser such as an aluminum electrolytic capacitor which accumulates light emission energy, after the light emission trigger signal has been received. In the example shown in FIG. 3, the delay interval is 10 μs.

Time T0 is a timing when the flash light emission reaches a peak value and an interval from the time T0 to the time T0 is a light emission rise interval. This rise interval is decided by the influence from the impedance of the xenon tube and the ESR (equivalent serial resistance) of the main condenser within the flash light emission section 206. In the example shown in FIG. 3, the rise interval is 30 μs. After that, an interval from the time T03 to time T04 is a light emission peak interval and maintains the peak value of the light emission amount, while it is a short interval. In the example shown in FIG. 3, this peak interval is 5 μs.

Time T0 is a timing when the light emission attenuates to a half of the light emission peak, and a interval from the time T0 to the time T0 is an attenuation interval. In the example shown in FIG. 3, the attenuation interval is 100 μs. In the present embodiment, while the attenuation interval is defined to be half from the light emission peak to the light emission peak, this is an illustration and the attenuation interval may be optionally defined differently. The almost whole light emission energy is consumed when the light emission time has elapsed from the time T01 of the light emission trigger signal output to the time T0 of the half of the light emission peak.

After the attenuation interval, there is a tale interval until the light emission energy is finally consumed perfectly. While it is known that a tale extends gradually until the light emission energy is consumed perfectly, the ratio relative to the total flash light emission amount decreases abruptly. Note that, in the example shown in FIG. 3, the tale interval is 70 μs. The time such as the light emission delay interval, the rise interval, the attenuation interval, and the tale interval changes according to a flash circuit configuration, a main condenser capacity, and the like, and, in particular, changes according to the xenon tube impedance (equivalent resistance component and inductance component which change according to a tube length).

Figure 4:
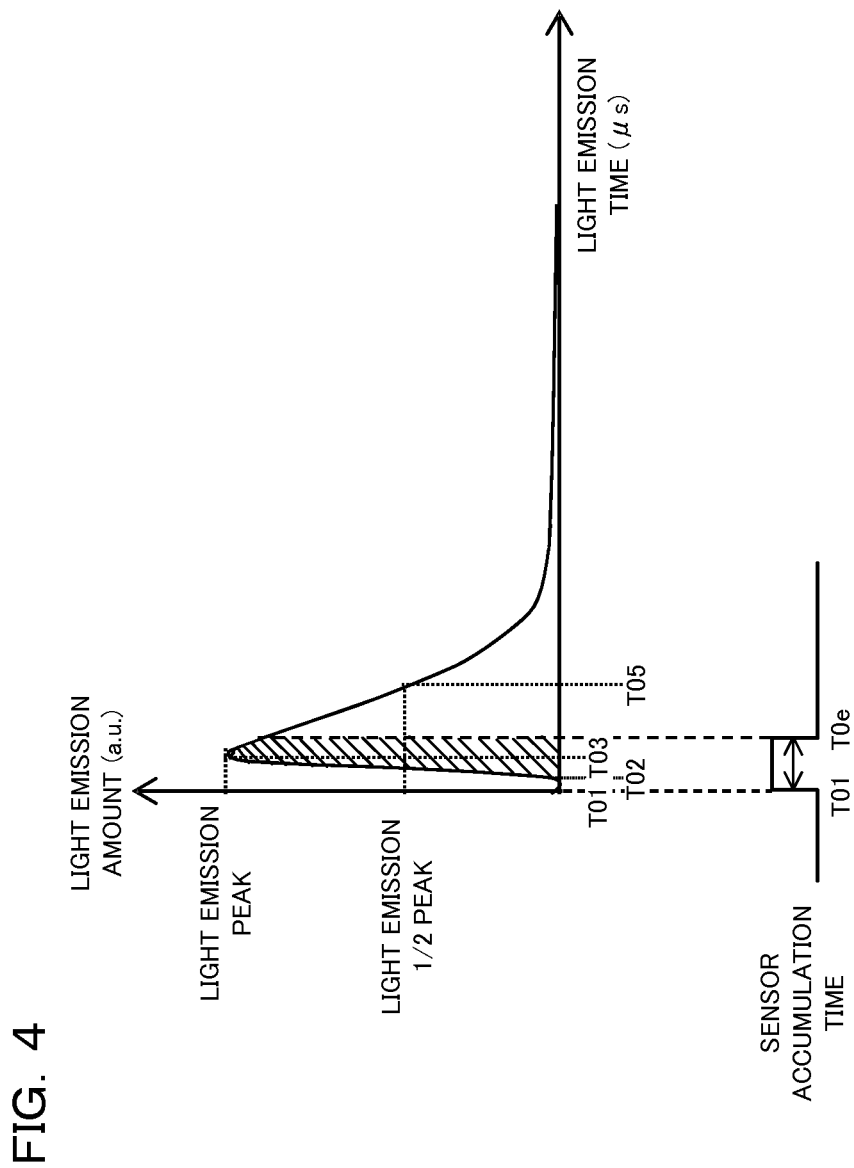
FIG. 4 is a diagram showing a relationship between flash light emission and a sensor accumulation time in a camera according to a first embodiment of the present invention.
Figure 5:
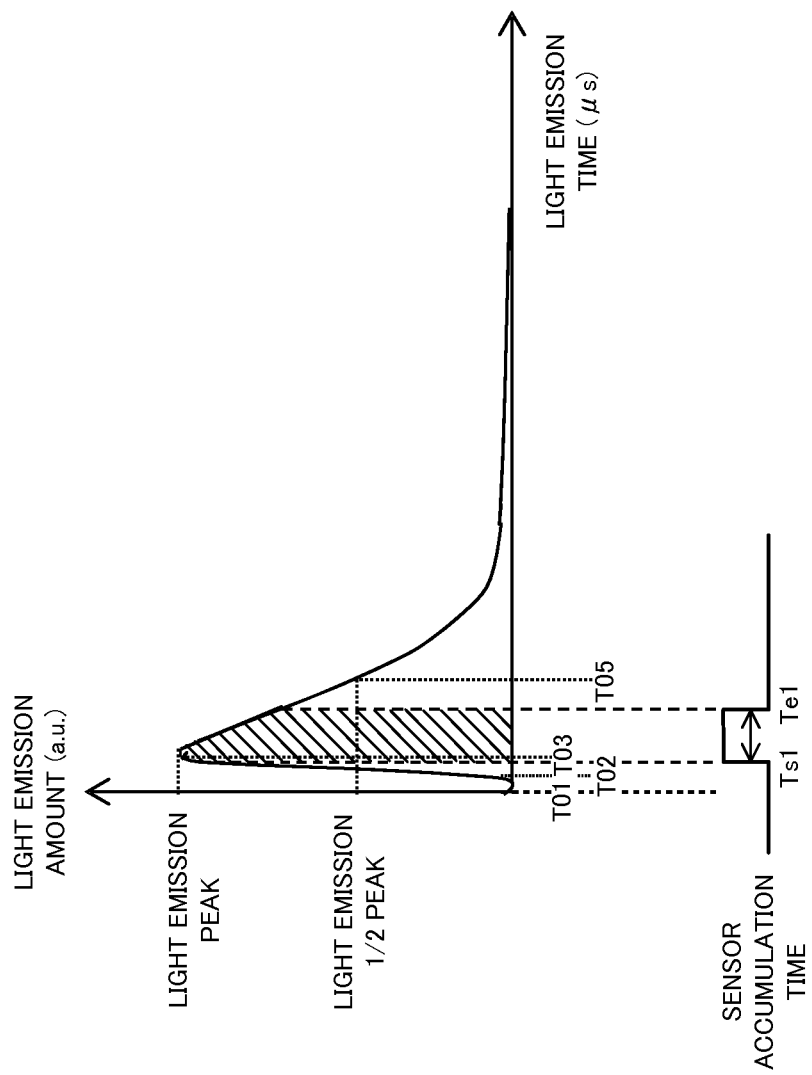
FIG. 5 is a diagram showing a relationship between flash light emission and a sensor accumulation time when both timings thereof are optimized in a camera according to a first embodiment of the present invention.

FIG. 4 and FIG. 5 show relationships between the flash light emission amount and the sensor accumulation period in the imaging element 107. FIG. 4 shows a conventional method, that is, a method in which the sensor accumulation starts at the same time as the flash light emission start, and FIG. 5 shows a method employed in the present embodiment, that is, a method in which the sensor accumulation starts late from the flash light emission start.

In the conventional method, as shown in FIG. 4, the light emission trigger signal is output and also the accumulation of the photoelectric current in each pixel of the imaging element 107 starts at time T01, and the accumulation completes at time T0 e. This accumulation period is a time corresponding to the shutter speed preliminarily calculated by the exposure calculation in above Step S8 (refer to FIG. 2) and 1/20000 seconds (=50 μs) in the example shown in FIG. 4.

As apparent from FIG. 4, in the flash light emission when the sensor accumulation in the imaging element 107 is started at the same time as the flash light emission start, that is, the light emission trigger output (shaded part in FIG. 4), a flash light emission amount in the light emission start delay interval and the rise interval is small with respect to a light emission amount after the peak, and the flash light emission cannot be efficiently utilized within the sensor accumulation period. That is, even when a high speed shutter allows the synchronized flash light emission, it is not possible to sufficiently utilize the capability of the flash in terms of a light emission amount.

Accordingly, the present embodiment is configured to perform the sensor accumulation of the imaging element 107 at a timing optimized for the flash light emission profile as shown in FIG. 5. That is, the sensor accumulation is configured to be started at time Ts1 later than the time T0 which is the output time of the light emission trigger signal, and the sensor accumulation is configured to be finished at time Te1 when a sensor accumulation time corresponding to the preliminarily calculated shutter speed has elapsed. While, also in the example shown in FIG. 5, the sensor accumulation time corresponding to the shutter speed is 1/20000 seconds (=50 μs) and in the same way as that in the example shown in FIG. 4, a flash light emission amount during the sensor accumulation period (shaded part in FIG. 5) is sufficiently large in a light emission amount ratio after the peak and the capability of the flash in terms of a light emission amount can be utilized as sufficiently as possible.

Next, a decision method of the sensor accumulation timing in the present embodiment will be explained by the use of FIG. 6 and FIG. 7. The flash light emission profile can be analyzed by a method of dividing the profile into the light emission delay interval, the initial light emission amount rise interval, the peak interval, the attenuation interval after the peak and the tale interval after that. A sensor accumulation timing may be optimized by a process of obtaining a light emission amount for each of the intervals and calculating a light emission amount during the sensor accumulation period by integration.

Figure 6:
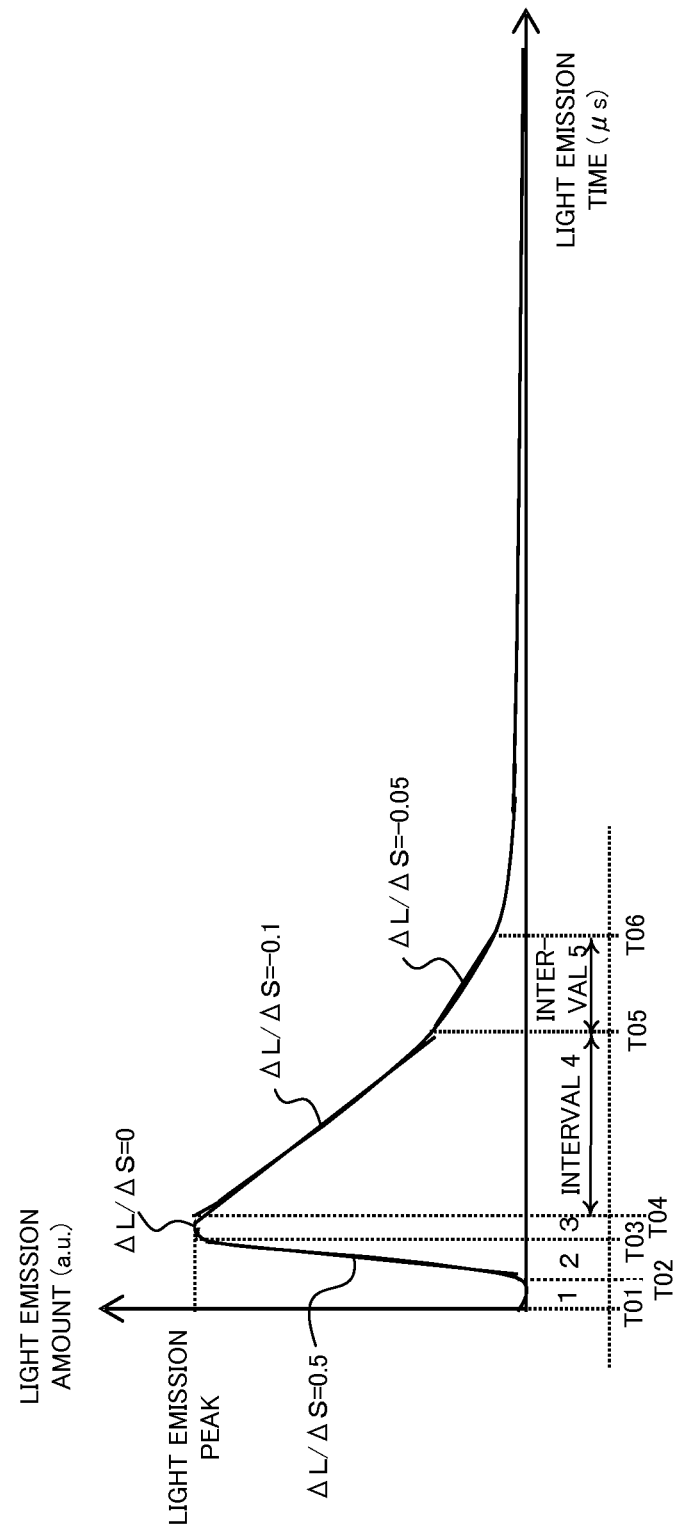
FIG. 6 is a diagram showing a state in which flash light emission is divided into intervals in a camera according to a first embodiment of the present invention.

In the present embodiment, the light emission profile is divided into five intervals as shown in FIG. 6, and FIG. 7 shows an example of characteristic values in each of the intervals. Here, a value for Interval 5, that is, 1528, in a light emission amount shown in the bottom line of FIG. 7 shows the maximum light emission amount in the flash of the example. This value can be converted into so-called Gno and Gv values by an appropriate conversion formula and is a value simply proportional to an exposure level. Here, a certain arbitrary unit is used.

The timing of the sensor accumulation period is determined by the use of the characteristic values as shown in FIG. 7. That is, the following characteristic values are used.

Figure 8:
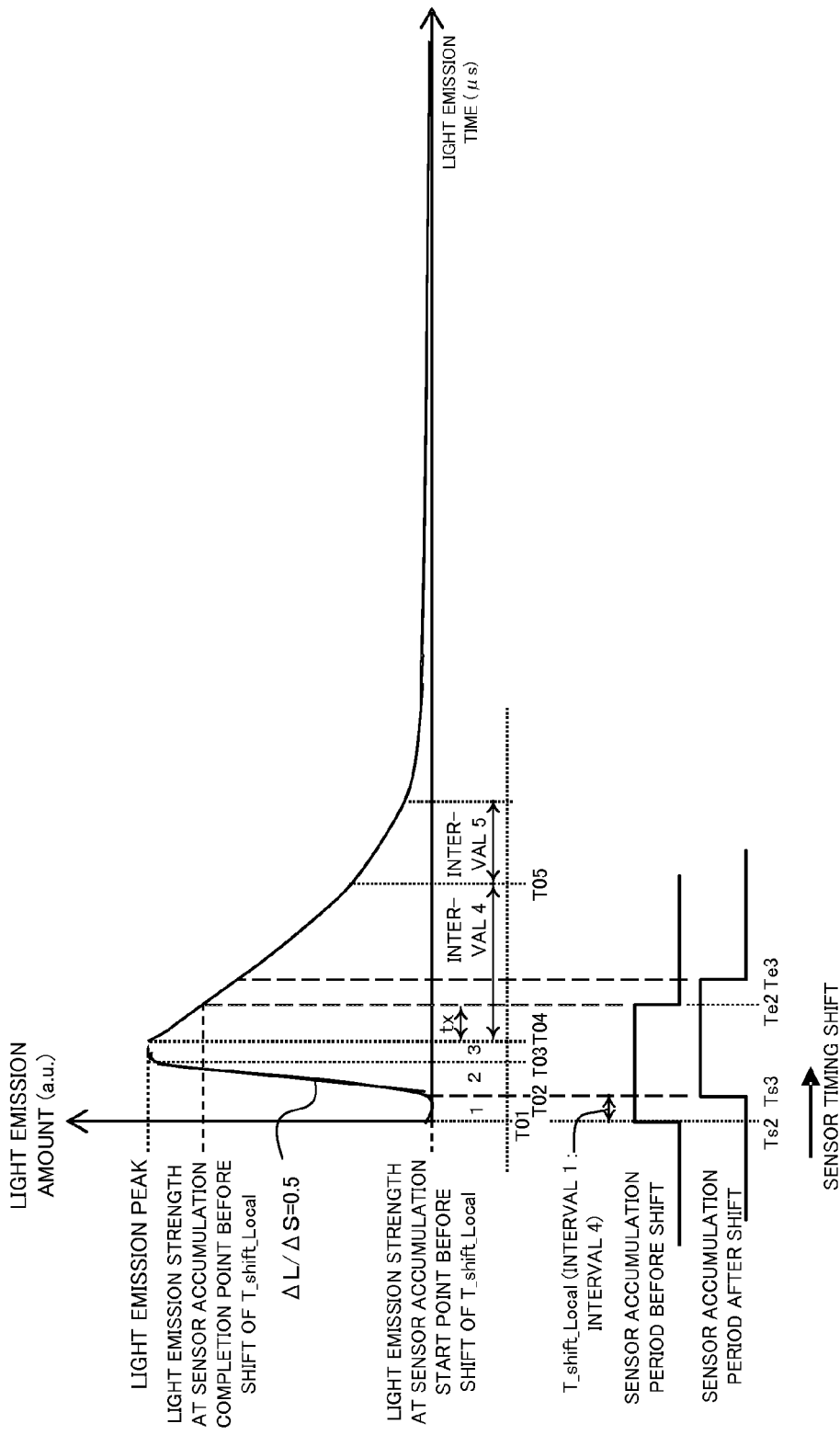
FIG. 8 is a diagram showing a state in which a sensor accumulation timing is shifted with respect to flash light emission in a camera according to a first embodiment of the present invention.

Each interval: t_interval
Time from light emission start: t_interval_sum
Change rate of light emission strength: ΔL/Δs
Light emission strength at any point in an interval: L
(Light emission strength in any interval is a function of Tx. A calculation formula of the light emission strength in any interval is shown in FIG. 7. Further, FIG. 7 and FIG. 8 are to be referred to for the definition of Tx.)
Light emission strength at the start point of each interval: L_start
Light emission strength at the completion point of each interval: L_last
Light emission amount in each interval: L·t
Total light emission amount: L·t_sum (1) First, a light emission amount and a light emission time thereof are calculated according to light emission profile information for a case in which the flash light emission is started at the same time as the sensor accumulation start. In this calculation, the following are defined.

Sensor accumulation time in the imaging element 107: T_sen
Light emission amount obtained within the sensor accumulation time: L·T_sen
Required light emission amount: L·T_Fl
Light emission time: T_Fl_def In the calculation of the light emission amount L·T_sen to be obtained within the sensor accumulation time T_sen, it is determined to which interval of Interval 1 to Interval 5 shown in FIG. 7 belongs the completion timing of T_sen, in a case in which light is emitted at the same time as the sensor accumulation start. In the determination here, it may be decided to which interval the T_sen completion timing belongs, by the comparison between the sensor accumulation time T_sen decided in response to the shutter speed and a time from the light emission start shown in FIG. 7. For example, if T_sen is 30 μs, the T_sen completion timing belongs to Interval 2, and if T_sen is 50 μs, the T_sen completion timing belongs to Interval 4.

After the determination of an interval to which the completion timing belongs, subsequently a light emission amount is calculated for each interval and an integration of the light emission amount for each interval is obtained. For example, when the sensor accumulation time T_sen is 30 μs, a total of the light emission amounts in Interval 1 and Interval 2 are obtained. That is, the light emission amount L·T_sen is obtained as follows when the sensor accumulation time T_sen is 30 μs.

$$L\cdot T\_sen = L\_start\_1 \times t\_interval\_1 + L\_start\_2 \times (30-10) + 0.5 \times (30-10) \times (30-10)/2 \quad (1)$$

(2) Next, when the flash light emission is started at the same time as the sensor accumulation start, it is determined whether a required light emission amount L·T_Fl can be obtained or not within the accumulation time T_sen, that is, whether a light emission amount L·T_Fl within the accumulation time T_sen is larger than the required light emission amount L·T_Fl or not by the following formula.

$$L\cdot T\_sen \geq L\cdot T\_Fl \quad (2)$$

If L·T_sen≥L·T_Fl is satisfied in this determination result, a sufficient light amount can be obtained even when the flash light emission is started at the same time as the sensor accumulation.

Note that, even when a sufficient light amount is obtained, it is necessary to shift the light emission amount of the flash or the accumulation period for obtaining an appropriate exposure. That is, the appropriate exposure may be obtained by either of the following two methods.

(a) To stop the flash light emission at an appropriate timing for controlling the light emission amount
  (b) To shift the timing of the accumulation period (in other words, timing of the electronic shutter)
  (received light amount can be controlled in the direction of reduction of the reception light amount by a shift of the sensor accumulation period even during light emission)

(3) Next, if L·T_sen≥L·T_Fl is not satisfied, an accumulation period is determined so as to provide a sufficient light amount by a timing shift of the accumulation period. This is the same as the above method (b).

This timing shift amount of the accumulation period is determined as follows. First, since the sensor accumulation period is determined depending on the shutter speed calculated in Step S8, the completion time of the sensor accumulation time is determined automatically when the start time of the sensor accumulation period is determined. Accordingly, the present embodiment obtains a flash light emission amount within the sensor accumulation period by setting the output time of the light emission trigger signal as the start time of the sensor accumulation period, and subsequently shifts the start time of the sensor accumulation period to the next interval and obtains a flash light emission amount in the shifted sensor accumulation period. This shift is carried out until the last interval (Interval 5 in the present embodiment) and a flash light emission amount is obtained for every shift.

In addition, since the flash light emission amount decreases abruptly when the start time of the sensor accumulation period enters the attenuation interval (Interval 4 in the present embodiment), the calculation may be terminated in this interval. Note that, in consideration of various light emission profiles such as those of a LED light source and the like, the calculation may be performed in the same manner for all the intervals. The present embodiment performs the calculation in the same manner until the last interval.

Next, while the sensor accumulation period is being shifted, a total light emission amount of the flash light emission in each of the accumulation periods is obtained. Before detailed explanation by using a formula, an outline of the sensor accumulation period shift will be explained by the use of FIG. 8 to FIG. 11.

FIG. 8 shows a relationship between flash light emission having the above described light emission profile and a sensor accumulation period. As shown in FIG. 8, in a sensor accumulation period before a shift, the sensor accumulation period starts at time T01 =Ts2 and the sensor accumulation period completes at time Te2. When an interval from the time T01 to time T02 is defined as T_shift_Local (Interval 1: Interval 4) corresponding to Interval 1 in FIG. 8, the start of the accumulation period is shifted by T_shift_Local (Interval 1: Interval 4) in the sensor accumulation period after the shift. As a result, the sensor accumulation period starts at time Ts3 and the sensor accumulation period completes at time Te3.

Figure 9:
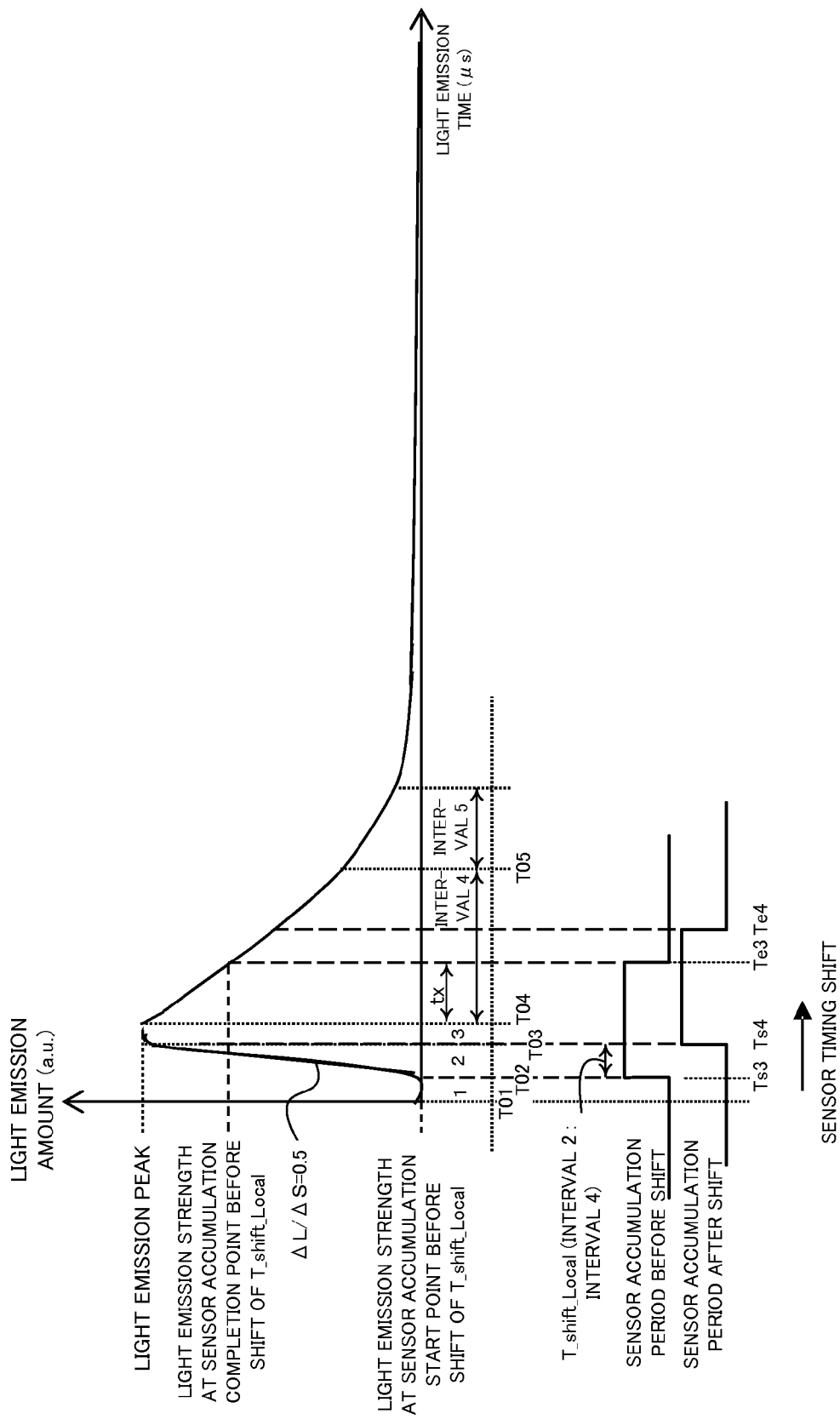
FIG. 9 is a diagram showing a state in which a sensor accumulation timing is shifted with respect to flash light emission further from the state of FIG. 8 in a camera according to a first embodiment of the present invention.
Figure 10:
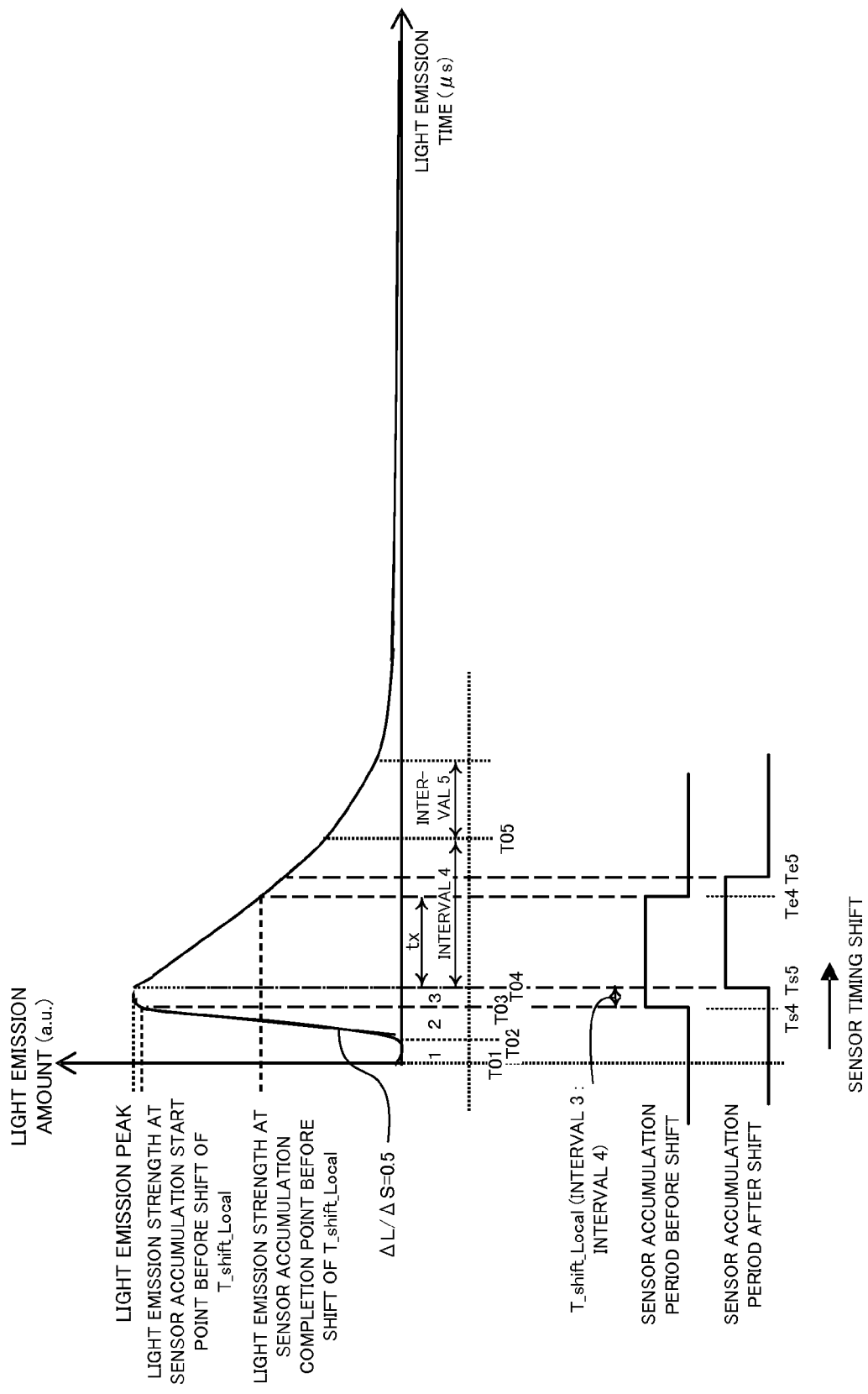
FIG. 10 is a diagram showing a state in which a sensor accumulation timing is shifted with respect to flash light emission further from the state of FIG. 9 in a camera according to a first embodiment of the present invention.

FIG. 9 shows a case in which a shift is performed further from the state of FIG. 8, and the start of the sensor accumulation period is moved to Interval 2 and shifted by T_shift_Local (Interval 2: Interval 4). The sensor accumulation period starts at time Ts4 after the shift and the sensor accumulation period completes at time Te4. FIG. 10 shows a case in which a shift is further performed from the state of FIG. 9, and the start of the sensor accumulation period is moved to Interval 3 and shifted by T_shift_Local (Interval 3: Interval 4). The sensor accumulation period starts at time Ts5 after the shift and the sensor accumulation period completes at time Te5.

Figure 11:
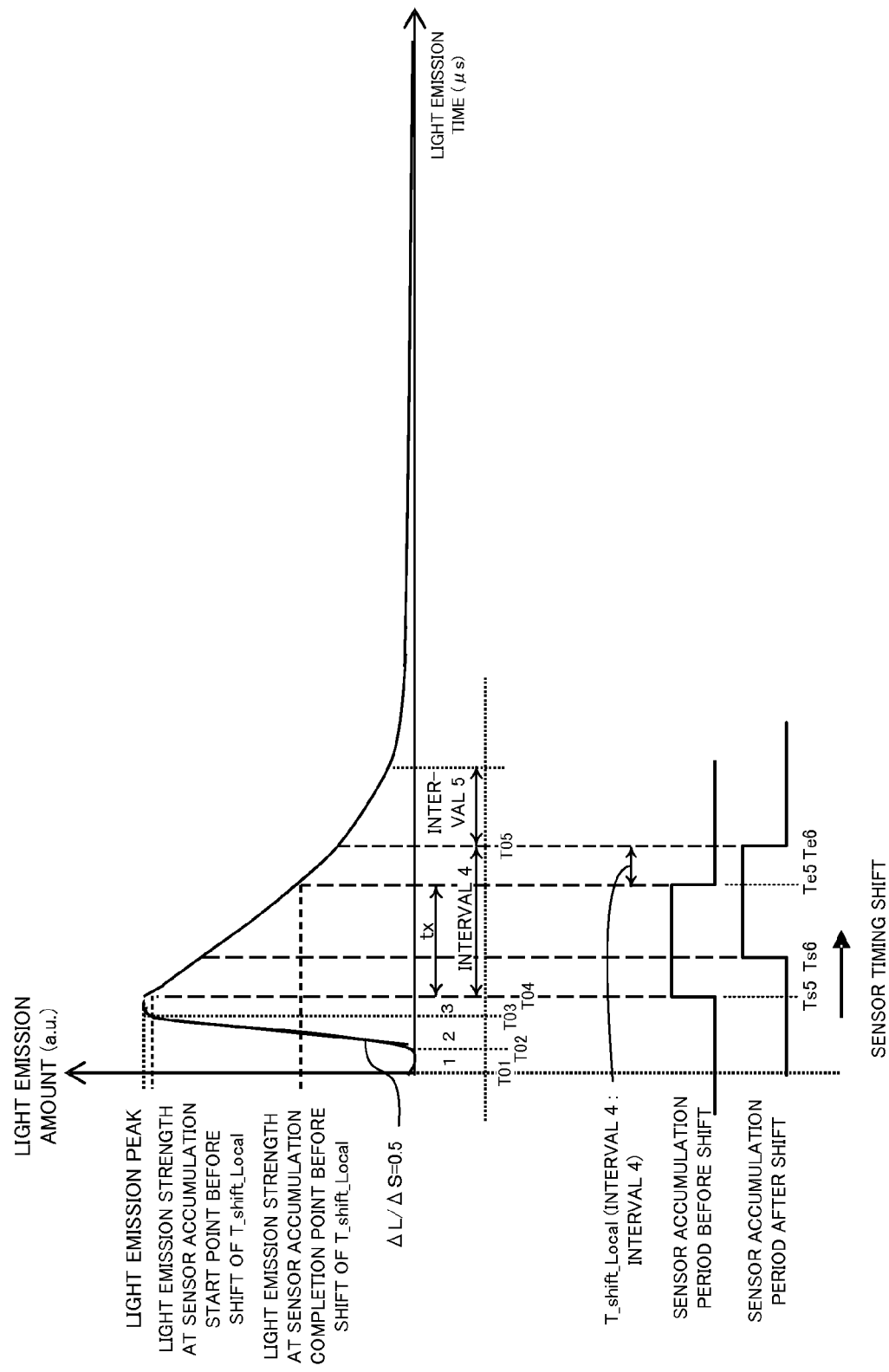
FIG. 11 is a diagram showing a state in which a sensor accumulation timing is shifted with respect to flash light emission further from the state of FIG. 10 in a camera according to a first embodiment of the present invention.

FIG. 11 shows a case in which a shift is further provided from a state of FIG. 10, and the start of the sensor accumulation is moved to Interval 4 and shifted by T_shift_Local (Interval 4: Interval 4). The sensor accumulation starts at time Ts6 after the shift and the sensor accumulation period completes at time Te6. In this manner, the present embodiment obtains a total light emission amount of the flash light emission while shifting the sensor accumulation period sequentially.

Next, the calculation of the total flash light emission amount and a decision method of the shift amount will be explained when the shift of the sensor accumulation period is performed as shown in FIG. 8 to FIG. 11. Here, an abbreviation symbol to be used in a formula is as follows.

Shift amount to be obtained finally: T_shift_Total
Shift amount to be used for designating the sensor accumulation start time and accumulation completion time when the light emission amount is obtained during the shift: T_shift_Local (sensor accumulation start interval: sensor accumulation completion interval)
The sensor accumulation start interval indicates an interval in which the sensor accumulation start time is included, and the sensor accumulation completion interval indicates an interval in which the sensor accumulation completion time is included. Here, the maximum shift amount is set to be an amount within a range in which each of the sensor accumulation start time and the sensor accumulation completion time does not pass the interval. The shift is performed for each of the divided intervals in this manner because the calculation of a change amount in the sensor accumulation charge with respect to a shift amount becomes simpler.

Light emission strength before a shift of T_shift_Local: L_start_shift_interval
Loss by the shift of the sensor accumulation start time: L·t_Loss (sensor accumulation start interval)
Gain by the shift of the sensor accumulation completion time: L·t_Gain (sensor accumulation completion interval)

Total gain by the shift of the sensor accumulation start time and the accumulation completion time: L·t_Gain (sensor accumulation start interval: sensor accumulation completion interval)

Total gain of a shift history: L·t_Gain_Total

L_start_shift_interval, which shows light emission strength before a shift of T_shift_Local, is obtained from a value described in a column of light emission strength at any point in an interval shown in FIG. 7 or from a formula. Tx in the column is a shift from a start point in the interval thereof. When the accumulation start time or the accumulation completion time exists on a region boundary of the intervals, tx becomes zero (tx=0) and L_start_shift_interval becomes equal to a light emission strength at the start point of each interval described in FIG. 7, L_start.

When a total flash light emission amount in each accumulation period is obtained while the sensor accumulation period is being shifted, first a total flash light emission amount L·t_Gain_Total is obtained for a case in which the sensor accumulation start time exists in Interval 1 and the sensor accumulation completion time exists in Interval x. Here, each of the interval start points is defined to be included in the interval, and each of the interval completion points is defined not to be included in the interval.

$$L \cdot t\_\text{Loss}(\text{Interval 1}) = L\_\text{start\_shift\_Interval 1}$$

$$*T\_\text{shift\_Local}(\text{Interval 1:Interval } x) +$$

$$\Delta L/\Delta s\_\text{Interval 1} * T\_\text{shift\_Local}(\text{Interval 1:Interval}$$

$$x) * T\_\text{shift\_Local}(\text{Interval 1:Interval } x)/2 \quad (3)$$

$$L \cdot t\_\text{Gain}(\text{Interval } x) = L\_\text{start\_shift\_Interval } x$$

$$*T\_\text{shift\_Local}(\text{Interval 1:Interval } x) +$$

$$\Delta L/\Delta s\_\text{Interval } x * T\_\text{shift\_Local}(\text{Interval 1:Interval}$$

$$x) * T\_\text{shift\_Local}(\text{Interval 1:Interval } x)/2 \quad (4)$$

$$L \cdot t\_\text{Gain}(\text{Interval 1:Interval } x) = L \cdot t\_\text{Gain}(\text{Interval } x) - L \cdot t\_\text{Loss}(\text{Interval 1}) \quad (5)$$

$$L \cdot t\_\text{Gain\_Total} = L \cdot t\_\text{Gain}(\text{Interval 1:Interval } x) \quad (6)$$

Here, * in the formula means multiplication.

Above Formula (3) corresponds to a light emission amount reduced by a shift of the sensor accumulation start time and Formula (4) corresponds to a light emission amount increased by a shift of the sensor accumulation completion time. Accordingly, a light emission amount increased (decreased) by the sensor accumulation period shift becomes Formula (5) by using Formula (3) and Formula (4), and L·t_Gain_Total is equal to L·t_Gain (Interval 1: Interval x), since this is the first shift calculation. By a shift of T_shift_Local (Interval 1: Interval x), the sensor accumulation start time or the sensor accumulation completion time enters a new region and the next combination of the intervals is determined. FIG. 8 corresponds to an example of x=4. Further, the drawing corresponds to a case in which the sensor accumulation start time is shifted into Interval 2 by the shift and the sensor accumulation completion time stays in Interval 4. Here, the next state is determined as shown in FIG. 9.

When it is assumed that the sensor accumulation start time is shifted to Interval 2 and the sensor accumulation completion time stays in Interval x by a shift of T_shift_Local (Interval 1: Interval x), the next shift amount is decided to be T_shift_Local (Interval 2: Interval x) (in this manner, the next shift amount is determined to which interval the sensor accumulation start time and the sensor accumulation completion time are moved by the previous shift). In the same way as the case in which the sensor accumulation start time exists in Interval 1, a total flash light emission amount is obtained as follows.

When the sensor accumulation start time exists in Interval 2 and the sensor accumulation completion time exists in Interval x, a total flash light emission amount L·t_Gain_Total is obtained.

$$L \cdot t\_\text{Loss}(\text{interval 2}) = L\_\text{start\_shift\_interval 2}$$

$$*T\_\text{shift\_Local}(\text{Interval 2:Interval } x) +$$

$$\Delta L/\Delta s\_\text{Interval 2} * T\_\text{shift\_Local}(\text{Interval 2:Interval}$$

$$x) * T\_\text{shift\_Local}(\text{Interval 2:Interval } x)/2 \quad (7)$$

$$L \cdot t\_\text{Gain}(\text{Interval } x) = L\_\text{start\_shift\_Interval } x$$

$$*T\_\text{shift\_Local}(\text{Interval 2:Interval } x) +$$

$$\Delta L/\Delta s\_\text{Interval } x * T\_\text{shift\_Local}(\text{Interval 2:Interval}$$

$$x) * T\_\text{shift\_Local}(\text{Interval 2:Interval } x)/2 \quad (8)$$

$$L \cdot t\_\text{Gain}(\text{Interval 2:Interval } x) = L \cdot t\_\text{Gain}(\text{Interval } x) - L \cdot t\_\text{Loss}(\text{Interval 2}) \quad (9)$$

$$L \cdot t\_\text{Gain\_Total} = L \cdot t\_\text{Gain}(\text{Interval 1:Interval } x) + L \cdot t\_\text{Gain}(\text{Interval 2:Interval } x) \quad (10)$$

In this manner, by a shift of T_shift_Local (Interval 2: Interval x), the sensor accumulation start time or the sensor accumulation completion time enters the new region and the next combination of the intervals is determined. FIG. 9 corresponds to an example of x=4. Further, the drawing corresponds to a case in which the sensor accumulation start time is shifted to Interval 3 and the sensor accumulation completion time stays in Interval 4. Here, the next state is determined as shown in FIG. 10.

Next, when it is assumed that the sensor accumulation start time exists in Interval 4 and the sensor accumulation completion time exists in Interval y, T_shift_Local (Interval 4: Interval y) is decided. Also in this case, a total flash light emission amount can be obtained similarly by following Formula (11) to Formula (14). FIG. 11 corresponds to an example of y=4. Further the drawing corresponds to a case in which the sensor accumulation start time stays in Interval 4 and the sensor accumulation completion time is shifted to Interval 5. Here, the state in which the sensor accumulation start time exists in Interval 4 and the sensor accumulation completion time exists in Interval 5 is determined as the next state (not shown in the drawing).

When the sensor accumulation time exists in Interval 4 and the sensor accumulation completion time exists in Interval y, a total flash light emission amount L·t_Gain_Total is obtained.

$$L \cdot t\_\text{Loss}(\text{interval 4}) = L\_\text{start\_shift\_interval 1}$$

$$*T\_\text{shift\_Local}(\text{Interval 4:Interval } y) +$$

$$\Delta L/\Delta s\_\text{Interval 1} * T\_\text{shift\_Local}(\text{Interval 1:Interval}$$

$$y) * T\_\text{shift\_Local}(\text{Interval 4:Interval } y)/2 \quad (11)$$

$$L \cdot t\_\text{Gain}(\text{Interval } y) = L\_\text{start\_shift\_Interval } y$$

$$*T\_\text{shift\_Local}(\text{Interval 4:Interval } y) +$$

$$\Delta L/\Delta s\_\text{Interval } y * T\_\text{shift\_Local}(\text{Interval 4:Interval}$$

$$y)*T\_shift\_Local(\text{Interval 4:Interval } y)/2 \quad (12)$$

$$L \cdot t\_Gain(\text{Interval 4:Interval } y) = L \cdot t\_Gain \\ (\text{Interval } y) - L \cdot t\_Loss(\text{Interval 4}) \quad (13)$$

$$L \cdot t\_Gain\_Total = L \cdot t\_Gain(\text{Interval 1:Interval } x) + L \cdot t\_Gain(\text{Interval 4:Interval } x) + \ldots + L \cdot t\_Gain(\text{Interval 2:Interval } y) \quad (14)$$

In this manner, the total flash light emission amount is obtained to the last interval (Interval 5 in the present embodiment) while the interval for the sensor accumulation start time is being shifted. During this time, when an insufficient light emission amount (L·T_Fl–L·T_sen) is compensated, the shift is terminated. When the insufficient light emission amount (L·T_Fl–L·T_sen) is not compensated even in the shift to the last interval, a condition providing the maximum L·t_Gain_Total is set as T_shift_Total. This is a sum of T_shift_Total until L·t_Gain_Total is maximized. The condition providing the maximum is not always a medium shift among the shift combinations.

Furthermore, when the condition compensating the insufficient light emission amount (L·T_Fl–L·T_sen) is determined to be satisfied (determination in Step S12 of FIG. 2), the flash light emission amount typically becomes excessive, and thus the best shift amount is determined. It is possible to obtain a relationship between a shift amount smaller than T_shift_Local in an interval combination and a loss by solving a quadratic function in a relational expression of a shift amount and a loss. When the calculation is performed in a photographing apparatus such as a camera, the relational expression may be replaced with a simple calculation formula by a linear approximation or from a viewpoint of an error or a light emission profile. However, when the light emission is to be stopped at the best amount, the best shift amount needs not be decided and an excessive amount by the shift may be controlled approximately by the light emission amount control of the flash.

As explained above, the first embodiment of the present invention is configured to store the emitted light waveform information of the flash 200 in the nonvolatile memory 202, to calculate the reception light amount to be received by the imaging element 107 within the sensor accumulation time by using the electronic shutter speed of the imaging element 107 calculated in Step S8, that is, the sensor accumulation time, and to obtain the sensor accumulation timing to be able to receive the actual light emission amount. Accordingly, it becomes possible to realize a higher flash synchronization speed utilizing the electronic shutter of the imaging element, and also to efficiently utilize the light emission energy of the flash.

Next, a variation example of the first embodiment of the present invention will be explained by the use of FIG. 12 to FIG. 16. The first embodiment of the present invention is configured to shift the start of the sensor accumulation to after the start of the light emission, that is, after the output time of the light emission trigger signal, and to perform the sensor accumulation at the best point with respect to the flash light emission. In the same way, the present variation example also performs the sensor accumulation at the best point with respect to the flash light emission while shifting the sensor accumulation period. However, when above Formula (2), that is, the relationship of L·T_sen≥L·T_Fl, is satisfied, the present variation example is configured to shift the timing of the sensor accumulation period to the minus side. That is, the present variation example is configured to perform adjustment so as to obtain an appropriate exposure by shifting the start of the sensor accumulation period to before the start of the light emission, that is, before the output of the light emission trigger signal.

In explaining a decision method of a timing for a sensor accumulation period in the present variation example, first, FIG. 12 shows an example in which characteristic values regarding the present variation example are added to the characteristic values in each interval shown in FIG. 7. In the present variation example, Interval 0 is provided before Interval 1 and the contents except this point is the same as those of FIG. 7.

Figure 15:
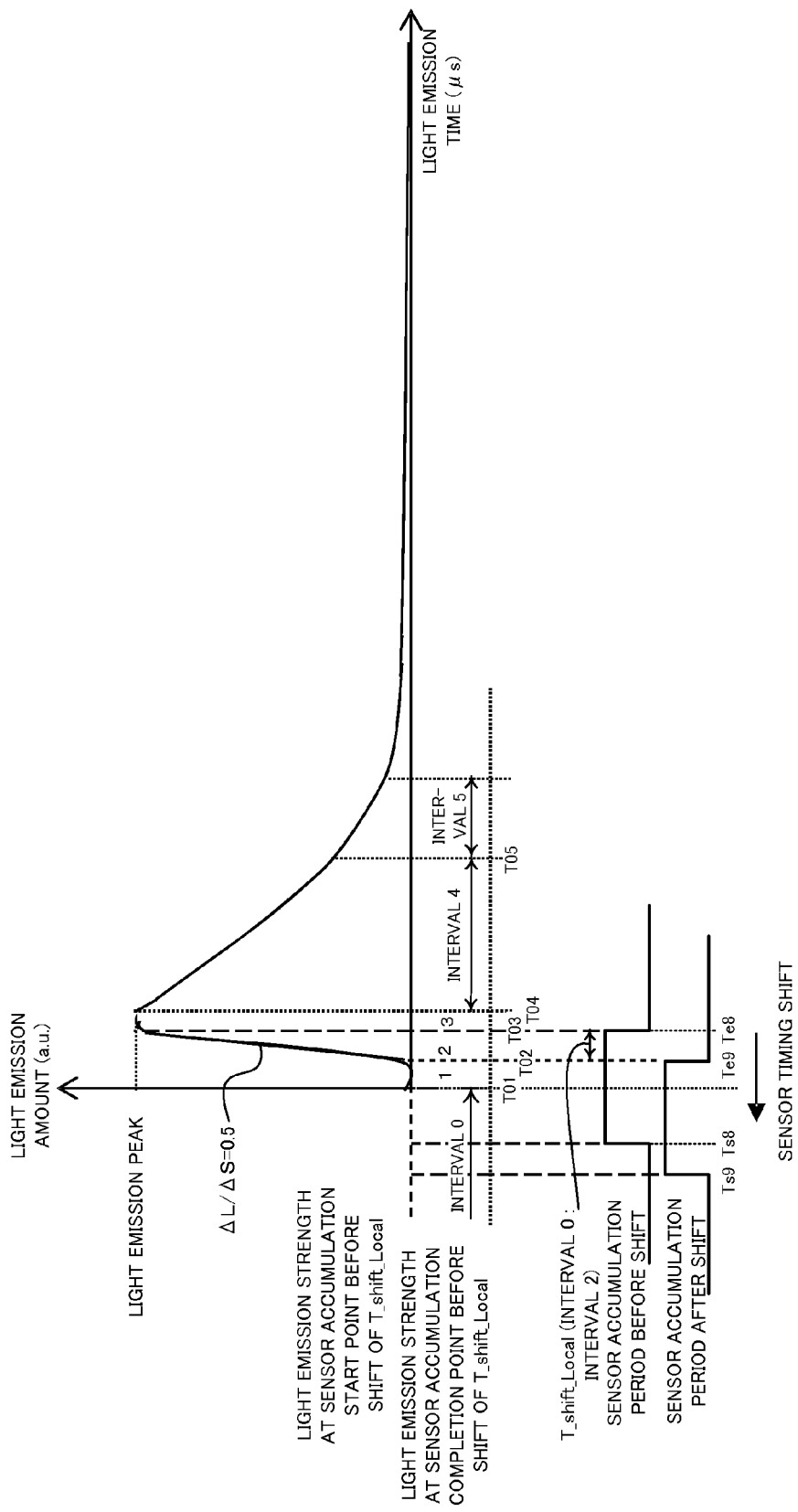
FIG. 15 is a diagram showing a state in which a sensor accumulation timing is shifted with respect to flash light emission further from the state of FIG. 14 in a camera according to a variation example of a first embodiment of the present invention.

Before detailed explanation by using a formula, an outline will be explained for the shift of the sensor accumulation timing to the minus side by the use of FIG. 13 to FIG. 15. FIG. 13 shows a relationship between flash light emission having a light emission profile shown in FIG. 12 and a sensor accumulation period. As shown in FIG. 13, in the sensor accumulation period before a shift, the sensor accumulation period starts at time T01 =Ts2 and the sensor accumulation period completes at time Te2. On the other hand, in the sensor accumulation period after the shift, the start of the sensor accumulation period is shifted by T_shift_Local (Interval 0: Interval 4), and the sensor accumulation period starts at time Ts7 and the sensor accumulation period completes at time Te7.

FIG. 14 shows a case in which a shift is further performed from the state of FIG. 13, and the completion of the sensor accumulation period is moved from Interval 4 to Interval 3 and shifted by T_shift_Local (Interval 0: Interval 3). After the shift, the sensor accumulation period starts at time Ts8 and the sensor accumulation period completes at time Te8. FIG. 15 shows a case in which a shift is further performed, and the completion of the sensor accumulation period is moved to Interval 2 and shifted by T_shift_Local (interval 0: Interval 2). After the shift, the sensor accumulation period starts at time Ts9 and the sensor accumulation period completes at time Te9. In this manner, the present variation example obtains a total light emission amount of the flash light emission while shifting the sensor accumulation period sequentially to the minus side.

Next, the calculation of the total flash light emission amount and a decision method of the shift amount will be explained when the sensor accumulation period is shifted to the minus side as explained by the use of FIG. 13 to FIG. 15. The calculation of the shift amount is performed for a shift of the sensor accumulation period, which is provided with the sensor accumulation start time and the sensor accumulation completion time, starting from the first timing of Interval 1 until the sensor accumulation completion time is shifted to the start interval (Interval 1 in the example), or until an excessive light emission amount (L·t_Fl_def–L·t_Fl) becomes equal to or smaller than zero.

Here, abbreviation symbol to be used in a formula is as follows. Since the shift direction is the minus direction, "minus" is added on the head. Furthermore, since the light emission amount does not increase by the shift, only a loss is obtained.

Sift amount to be obtained finally: minus_T_shift_Total

Shift amount to be used for designating a sensor accumulation start time and accumulation completion time when the light emission amount is obtained during the shift: minus_T_shift_Local (sensor accumulation start interval: sensor accumulation completion interval)

Here, the maximum shift amount is set to be an amount within a range in which each of the sensor accumulation start time and the sensor accumulation completion time does not pass the interval. The shift is performed for each of the divided intervals in this manner because the calculation of a change amount in the sensor accumulation charge with respect to a shift amount becomes simpler.

Light emission strength before a shift of minus_T_shift_Local: L_start_shift_interval Loss by the shift of the sensor accumulation start time: minus_L·t_Loss (sensor accumulation start interval)

Total loss by the shift of the sensor accumulation start time and the accumulation completion time: minus_L·t_Loss (sensor accumulation start interval: sensor accumulation completion interval)

Total loss of a shift history: minus_L·t_Loss_Total

L_start_shift_interval, which shows light emission strength before a shift of T_shift_Local is obtained from a value described in a column of light emission strength at any point in an interval shown in FIG. 12 or from a formula. Tx in the column is a shift from a start point in the interval thereof. When the accumulation start time or the accumulation completion time exists on a region boundary of the interval, tx becomes zero (tx=0) and L_start_shift_interval becomes equal to a light emission strength at the start time in each interval described in FIG. 12, L_start.

When a total flash light emission amount in each accumulation period is to be obtained while the sensor accumulation period is being shifted to the minus side, first, a total flash light emission amount minus_L·t_Loss_Total is obtained when the sensor accumulation start time exists in Interval 0 and the sensor accumulation completion time exists in Interval x.

minus_L·t_Loss(Interval x)=

L_start_shift_Interval x*T_shift_Local(Interval 0:

Interval x)+ΔL/Δs_Interval x*T_shift_Local(Interval

0:Interval x)*T_shift_Local(Interval 0:Interval x)/2    (15)

L·t_Loss(Interval 0:Interval x)=L·t_Loss(Interval x)    (16)

minus_L·t_Loss_Total=L·t_Loss(Interval 0:Interval x)    (17)

By the shift of T_shift_Local (Interval 0: Interval x), the sensor accumulation completion time enters a new region boundary, and the next combination of the intervals is made as shown in FIG. 13 to FIG. 15.

Next, when it is assumed that the sensor accumulation start time stays in Interval 0 and the sensor accumulation completion time is shifted to Interval y by a shift of T_shift_Local (Interval 0: Interval x), the next shift amount is determined to be T_shift_Local (Interval 0: Interval y) (in this manner, the next shift amount is determined to which interval the sensor accumulation start time and the sensor accumulation completion time are moved by the previous shift). Similarly in this case, a total light emission amount of the flash light emission can be obtained by following Formula (18) to Formula (20). FIG. 13 corresponds to an example of x=4 or Y=4. Further, the drawing corresponds to a case in which the sensor accumulation start time stays in Interval 0 and the sensor accumulation completion time is shifted to Interval 3 by the shift. Here, the next state is determined as shown in FIG. 14.

FIG. 14 corresponds to a case in which x is equal to 3 or y is equal to 3 (x=3 or y=3), and the sensor accumulation start time stays in Interval 0 and the sensor accumulation completion time is shifted to Interval 2. Here, the next state is determined as shown in FIG. 15. FIG. 15 corresponds to a case in which x is equal to 2 or y is equal to 2 (x=2 or y=2), and the sensor accumulation start time stays in Interval 0 and the sensor accumulation completion time is shifted to Interval 1 by the shift.

When the sensor accumulation start time exist in Interval 0 and the sensor accumulation completion time exists in Interval y, a total flash light emission amount L·t_Loss_Total is obtained.

minus_L·t_Loss(interval y)=

L_start_shift_interval y*T_shift_Local(Interval 0:

Interval y)+ΔL/Δs_Interval y*T_shift_Local(Interval

0:Interval y)*T_shift_Local(Interval 0:Interval y)/2    (18)

L·t_Loss(Interval 0:Interval y)=L·t_Loss(Interval y)    (19)

minus_L·t_Loss_Total=L·t_Loss(Interval 0: Interval y)+L·t_Loss(Interval 0:Interval y)    (20)

In this manner, the total light emission amount of the flashlight emission is obtained until the sensor accumulation completion time comes to the start point (Interval 0 in the present embodiment) while the sensor accumulation start time is being shifted to the minus side. During this time, the shift is completed when an excessive light emission amount (L·t_Fl_def−L·t_Fl) becomes equal to or smaller than zero. When the compensation condition of the excessive light emission amount (L·t_Fl_def−L·T_Fl) is determined to be satisfied, the flash light emission amount typically becomes excessive, and thus the best shift amount is determined. It is possible to obtain a relationship between a shift amount smaller than minus_T_shift_Local in an interval combination and a loss by solving a quadratic function in a relational expression of a shift amount and a loss.

When the calculation is performed in a photographing apparatus such as a camera, the relational expression may be replaced with a simple calculation formula by a linear approximation or from a view point of an error or a light emission profile. Furthermore, it is possible to obtain a relationship between a shift amount smaller than T_shift_Local in an interval combination and a loss by solving a quadratic function in a relational expression of a shift amount and a loss. Also in this case, when the calculation is performed in a photographing apparatus such as a camera, the relational expression may be replaced with a simple calculation formula by a linear approximation or from a viewpoint of an error or a light emission profile.

As explained above, in the variation example of the first embodiment of the present invention, it is possible to efficiently utilize the light emission amount of the flash even for the high-speed shutter by controlling the timing of the electronic shutter, that is, the start timing and the completion timing of the sensor accumulation.

Note that, when an exposure amount is adjusted only by the shift of the electronic shutter timing, the control of the light emission amount needs not be performed on the flash side and thus it is possible to allow the configuration to be simpler and to have a lower cost. However, this causes the light emission to generate excessive light emission amount and causes an energy loss. For a method of solving this problem, it is only necessary to control the light emission amount in a rough manner. For example, it is only necessary to stop the light emission when the sensor accumulation period completes.

As explained above, the first embodiment and the variation example of the present invention are configured to calculate the accumulation time of the imaging element 107 and the reception light amount from the flash 200 in the imaging element 107 and to set the start timing of the accumulation in the imaging element 107 from the light emission start of the flash 200 based on the emitted light waveform information stored in the nonvolatile memory 202 and the reception light amount in the imaging element 107. Accordingly, it is possible to realize a higher flash synchronization speed by utilizing the electronic shutter of the imaging element and also efficiently to utilize the light emission energy of the flash.

Next, a second embodiment of the present invention will be explained by the use of FIG. 16 to FIG. 19. The second embodiment is configured to control the flash light emission amount more appropriately than the first embodiment. Here, the control of the flash light emission amount means the controlling of the actual light emission amount in Step S13 of FIG. 12 so as to obtain an actual light emission amount determined by the processing shown in Steps S10 to S12.

Figure 16:
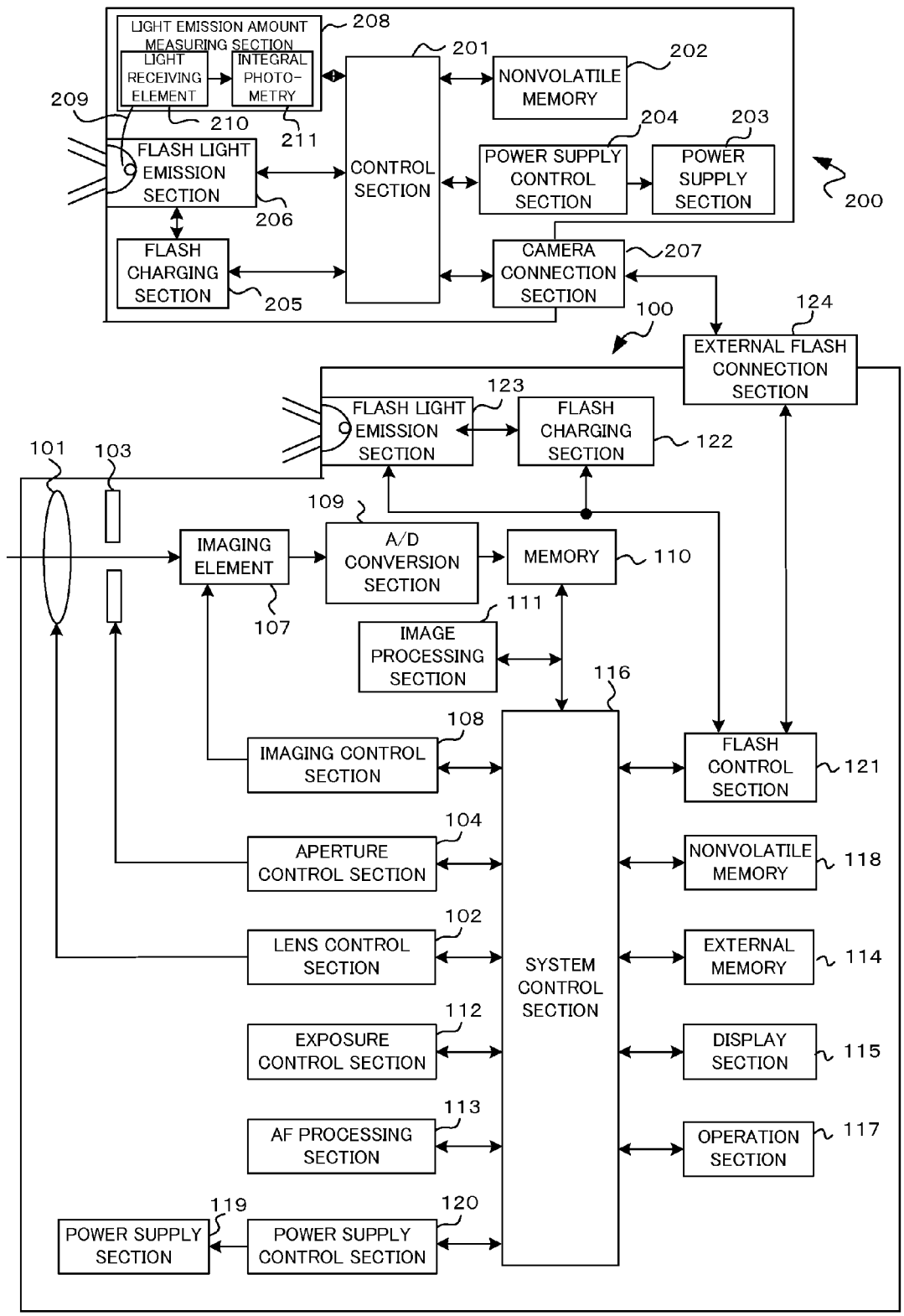
FIG. 16 is a block diagram mainly showing an electrical configuration of a camera according to a second embodiment of the present invention.

While a configuration of the present embodiment is approximately the same as that of the first embodiment shown in FIG. 1, a different point is that a light emission amount measuring section 208 is provided in the external flash 200 as shown in FIG. 16. Accordingly, this different point will be mainly explained.

The light emission amount measuring section 208 measuring the light emission amount of the light emission tube is provided in the neighborhood of the flash light emission section 206, and a light emission amount measured by this light emission amount measuring section 208 is transmitted to the control section 201. The light emission amount measuring section 208 is configured with a glass fiber 209, a light receiving element 210, and an integral photometry circuit 211. The glass fiber 209 guides a part of the flash light emission from a light emission tube in the flash light emission section 206 to the light receiving element 210. The light receiving element 210 performs photoelectric conversion of the part of the flash light emission and outputs the photoelectric current to the integral photometry circuit 211. The integral photometry circuit 211 starts the integration of the photoelectric current output by the light receiving element 210 according to an instruction from the control section 201 to convert the photoelectric current into a voltage corresponding to the received light amount, and outputs the voltage to the control section 201. This light emission amount measuring section 208 starts the measurement of the light emission amount of the flash light emission section 206 from the accumulation start of the imaging element 107, and, when the light emission amount reaches an appropriate light emission amount output by the exposure calculation section, the flash control section outputs a stop signal of the light emission to the flash light emission section 206.

Note that the system control section 116 and the imaging control section 108, which function as the accumulation control section, instruct the flash light emission section 123 or 206 to start the flash light emission and cause the imaging element 107 to start the accumulation based on the accumulation start timing. Furthermore, the system control section 116 and the flash control section 121, which function as the flash light emission control section, cause the flash light emission to start according to the above instruction of the flash light emission and cause the flash light emission of the flash light emission section 123 or 206 to stop based on the appropriate light emission amount output by the system control section 116 and the exposure control section 112, which function as the exposure calculation section. Other configuration is the same as the configuration in the first embodiment shown in FIG. 1 and detailed explanation will be omitted.

Next, the control of the flash light emission amount in the present embodiment will be explained. The method of shifting the accumulation timing of the imaging element 107 is a method of deciding a timing optimized for the flash light emission profile of the flash, and it is difficult to consider that the method can perform dimming with a sufficiently high degree of accuracy, because the method divides the light emission profile shown in above FIG. 6 and FIG. 7 into five intervals and controls the accumulation timing using simply approximated data. While it is obviously possible to improve the dimming accuracy by increasing the number of the divided intervals, this case causes an increase of a data amount to be stored and a cost increase of the apparatus.

Accordingly, the present embodiment is configured to perform, with a relatively rough accuracy, the calculation of the accumulation timing shift in the imaging element by dividing the light emission profile into five divisions, to calculate the accumulation start time so as to secure a required flash light emission amount, and to start the accumulation at this time, as described above. The present embodiment is also configured to control, with a higher degree of accuracy, the required flash light emission amount obtained by the light emission amount calculation by the light emission amount control of the flash. By the combination of these two control methods, it is possible to control the accumulation amount of the imaging element and the dimming with a high degree of accuracy.

Such a control method of the flash light emission amount includes the following two methods. A first one is a method of measuring the light emission amount by using a light receiving sensor and stopping the light emission when the light emission amount reaches a predetermined amount. Furthermore, a second one is a method of preliminarily preparing a table showing a relationship between a light emission time and the light emission amount, and deciding the light emission time and stopping the light emission, based on this light emission amount-time table.

First, the first method, that is, the method of measuring the light emission amount by using the light receiving sensor and controlling the light emission amount based on this measurement result, will be explained. Here, the processing of the light emission amount control in the external flash 200 will be explained according to FIG. 17.

Figure 17:
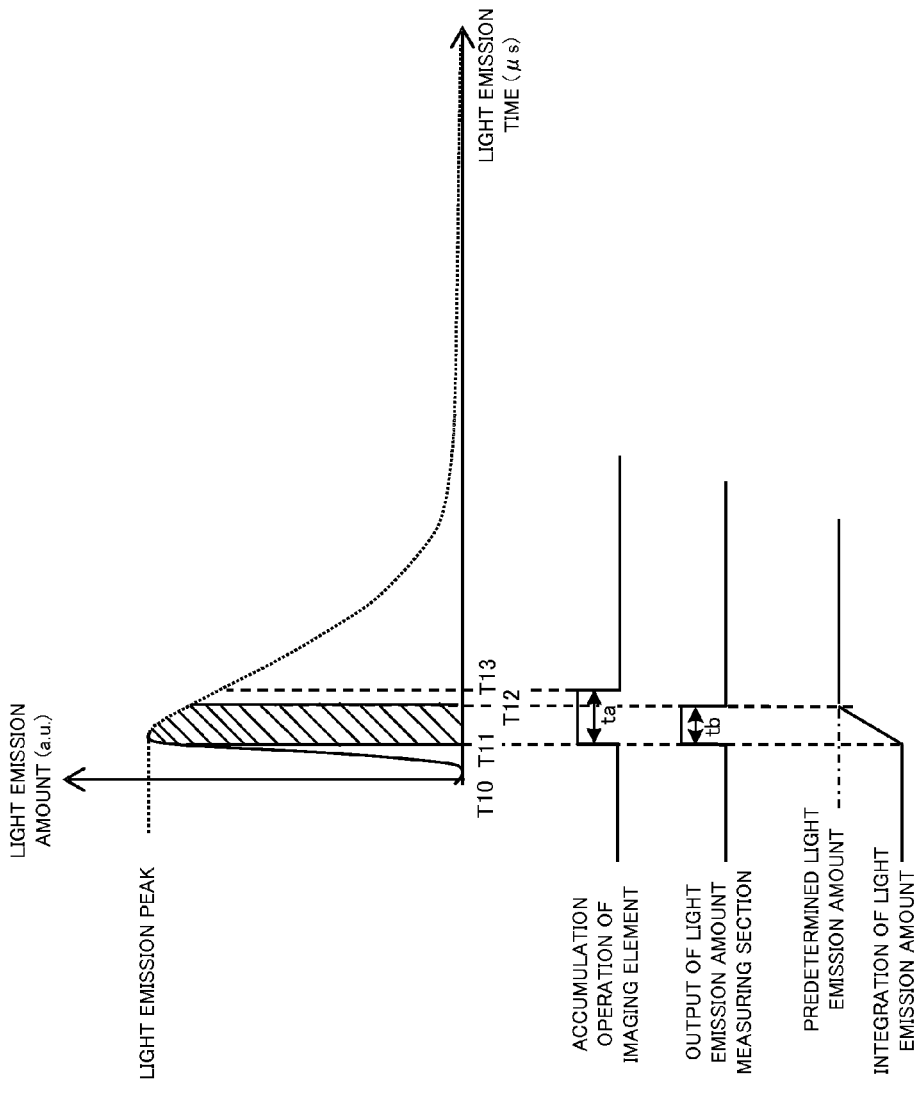
FIG. 17 is a diagram showing a state in which an actual light emission amount is controlled in a camera according to a second embodiment of the present invention.

In FIG. 17, time T10 is a time point when the flash light emission section 206 starts the light emission. That is, the control section 201 in the external flash 200 starts the light emission at the time T1 in response to a light emission start signal from the flash control section 121 in the camera 100.

After the flash light emission section 206 has started the light emission, the imaging element 107 starts the accumulation of the photoelectric current at time T1. That is, the accumulation in the imaging element 107 is started at a calculated accumulation start timing (i.e., time T11) by an instruction of the imaging control section 108 in Step S12 (refer to FIG. 2). Furthermore, the control section 201 in the external flash 200 outputs an integration start signal to the integral photometry circuit 211 in the light emission amount measuring amount section 208 at the same time (time T11) as the accumulation start of the imaging element 107 based on the accumulation timing received in the communication with the camera 100. Therefore, the integral photometry circuit 211 starts the integration of the photoelectric current generated in the light receiving element 210 (light receiving sensor) and outputs an integration voltage corresponding to the received light amount. This integration voltage corresponds to the area of the shaded part in the graph shown in FIG. 17.

After the start of the accumulation in the imaging element 107 at the time T11, the accumulation in the imaging element 107 is stopped by an instruction of the imaging control section 108 at time T13 when an accumulation time (=ta, i.e., time corresponding to an electronic shutter speed) calculated in Step S8 (refer to FIG. 2) has elapsed.

Meanwhile, after the start of the flash light emission at the time T11, the light emission of the flash light emission section 206 is stopped at time T12 when a integration voltage corresponding to a light emission amount measured by the light emission amount measuring section 208 reaches a predetermined amount. That is, the actual light emission amount data received in the communication with the camera 100 is preserved in the control section 201 in the external flash 200 and the control section 201 outputs a light emission stop signal to the flash light emission section 206 to stop the light emission when the output of the integral photometry circuit 211 in the light emission amount measuring section 208 reaches a predetermined voltage corresponding to the actual light emission amount (corresponding to the area of the shaded part in FIG. 17).

In this manner, the light emission of the flash light emission section 206 is stopped when the light emission amount is integrated from the accumulation start time (T11) of the imaging element 107 and reaches a required light emission amount, and thus it is possible to obtain the required light emission amount with a high precision. Here, the accumulation time to of the imaging element 107 is a time obtained by the accumulation time shift in Step S8, and the light emission time tb of the flash light emission section 206 becomes a time necessary for obtaining an actual light emission amount calculated in Step S12.

Note that there is a possibility that the accumulation stop timing in the imaging element 107 and the actual light emission stop timing in the flash light emission section 206 are exchanged each other temporally. In this light emission amount control, the control is performed with a high degree of accuracy and thus the accumulation time of the imaging element 107 may be set so as to be longer than an accumulation time obtained by the calculation within a range providing little error influence and may be set so as to be in order of the accumulation stop in the imaging element 107 after the actual light emission stop in the flash light emission section 206.

Furthermore, while the present embodiment has been explained for a case in which the light emission amount measuring section 208 is provided at the external flash 200 and controls the light emission amount of the external flash 200, the present embodiment may be obviously configured to control the light emission amount of the flash light emission section 123 built in the camera 100.

In this manner, by combining the method of measuring the flash light emission amount with the light receiving element to control the flash light emission amount together with the accumulation operation of shifting the accumulation time in the imaging element, it is possible to realize a higher flash synchronization speed and also to perform the dimming with a high degree of accuracy.

Next, the second method for the flash light emission amount control method, that is, the method of preliminarily preparing a table for a relationship between a light emission time and a light emission amount, shifting the accumulation time of the imaging element, and also deciding the light emission time according to this light emission amount-time table to stop the light emission, will be explained.

The nonvolatile memory 202 in the external flash 200 stores a light emission amount-time table as shown in FIG. 18, for example. This light emission amount-time table is configured so that, and this method is a generally utilized method. the light emission amount has a geometric progression. This is because, when performing the light emission amount control at a specific error rate, it is possible to achieve the accuracy by configuring the table with a geometric progression of the error rate The table shown in FIG. 18 has a 1.12 multiple geometric progression of the light emission amount and can provide the light emission amount having an accuracy of 12% (maximum error in the table selection). The present embodiment decides a light emission time from a light emission amount required for the pre-light-emission or the actual light emission according to such a light emission amount-time table and performs the control of the light emission stop.

Next, there will be explained a method for realizing a higher flash synchronization speed and also realizing a higher dimming precision by the combination with the accumulation operation of shifting the accumulation time of the imaging element.

The table in FIG. 19 shows a relationship between a light emission amount after a shift and a light emission time obtained from the light emission amount-time table shown in FIG. 18 for a light emission amount after the shift of the accumulation start time in the imaging element 107, when the accumulation of the imaging element 107 is started from time corresponding to the light emission time of No. 9.

In this second method, the light emission of the flash light emission section 206 is also started first. Then, the imaging element 107 in the camera 100 starts the accumulation of the imaging element 107 at the No. 10 timing in the example shown in FIG. 18 and FIG. 19 (corresponding to the time T11 of FIG. 17).

The control section 201 reads out the light emission amount-time table shown in FIG. 18 before the light emission from the nonvolatile memory 202 based on the accumulation timing obtained by the communication with the camera 100, and generates a table of a relationship between a light emission amount after the shift and a light emission time as shown in FIG. 19 for the light emission amount from the time of the No. 10 light emission time when starting the accumulation of the imaging element 107 at the No. 10 timing, for example.

For example, when an actual light emission amount obtained by the communication with the camera 100 is 10.0 (a.u.), No. 21 may be selected for a light emission amount after the shift closest to this value (the light emission amount after the shift of No. 21 is 10.523 and closest to 10.0). The light emission time of this No. 21 is 44.90 μs and it is possible to obtain an appropriate actual light emission amount by stopping the actual light emission of the flash light emission section 206 when 44.90 μs has elapsed from the light emission start timing (corresponding to the time T10 in FIG. 17). Then, the accumulation of the imaging element 107 is stopped at the time obtained preliminarily by the photographing exposure calculation in Step S8.

Note that, in the present embodiment, a ratio in the table for the light emission amount after the shift is shifted from the ratio of 1.12 in the geometric progression as shown in "ratio of table after shift" of FIG. 19 and thus the value to be taken for the light emission amount after the shift becomes coarse and the accuracy of the light emission amount control is degraded. For solving such a problem and obtaining the most appropriate light emission amount, the table has only to be subjected to linear interpolation processing. For example, by the interpolation of the light emission amount between No. 20 and No. 21 shown in the table of FIG. 19, a light emission time at which a light emission amount after the shift becomes 10.0 (a.u.) may be calculated.

Furthermore, plural tables after the shift similar to the table corresponding to FIG. 19 may be preliminarily prepared in response to the plural accumulation start times of the imaging element 107 and may be stored in the nonvolatile memory 202 to be read out and selected arbitrarily. Note that the light emission amount-time table shown in FIG. 18 may be used as the flash light emission profile information (refer to FIG. 7).

In this manner, the second embodiment of the present invention is configured to store the emitted light wave information of the flash 200 in the nonvolatile memory 202 and to obtain a sensor accumulation timing when the imaging element 107 can efficiently receive the flash light emission within a sensor accumulation time, in Step S12 by using an electronic shutter speed of the imaging element 107 (sensor accumulation time) calculated in Step S8.

Moreover, the second embodiment of the present invention can obtain an accurate actual light emission amount regarding a required actual light emission amount by controlling the actual light emission amount of the flash. Accordingly, it becomes possible to realize a higher flash synchronization speed by utilizing the electronic shutter of the imaging element, and also it becomes possible to efficiently utilize the light emission energy of the flash and to perform the dimming with a higher degree of accuracy.

Note that, while the first and second embodiments and the variation example of the present invention performs the flash light emission by using the external flash 200, obviously the flash light emission may be performed by the built-in flash and the sensor accumulation timing may be shifted for this case.

Furthermore, while the first and second embodiments and the variation example of the present invention has been explained for a case in which the global shutter is used as the electronic shutter in the imaging element 107, the rolling shutter obviously may be used in the same way as the global shutter if a delay in each line is not large.

Moreover, an embodiment and the variation example of the present invention have been explained for a case in which the digital camera is used as an apparatus for photographing, the camera may include a digital single reflex camera, a compact digital camera, a camera for a moving image such as a video camera and a movie camera, and further cameras built in a mobile phone, a PDA (Personal Digital Assist), a game console, and the like.

The present invention is not limited to the above embodiments as it is and can be applied by the modification of the constituents without departing the spirit of the invention in an implementation stage. Furthermore, various inventions can be formed by appropriate combinations of the plurality of constituents disclosed in the above embodiments. For example, some of the constituents may be omitted from all the constituents disclosed in the embodiments. Moreover, the constituents across the different embodiments may be combined with one another arbitrarily.

What is claimed is:

1. A photographing apparatus, comprising:
    an imaging section accumulating photoelectric current according to a received light amount and outputting an image signal according to this accumulated photoelectric current;
    an accumulation control section controlling an accumulation operation in the imaging section;
    a flash light emission section illuminating an object by flash light emission;
    an emitted light waveform storing section preliminarily storing emitted light waveform information which shows a relationship between a light emission time and a light emission strength in the flash light emission section and represents a light emission strength corresponding to a light emission time;
    an exposure calculation section calculating an accumulation time in the imaging section and a reception light amount corresponding to a required light emission amount of the flash light emission in the flash light emission section by the imaging section; and
    an accumulation start timing setting section setting a timing of accumulation start in the imaging section from the light emission start in the flash light emission section based on an output of the emitted light waveform storing section and the reception light amount corresponding to a required light emission amount of the flash light emission output by the exposure calculation section, wherein
    the accumulation control section instructs the flash light emission section to start flash light emission and also causes the imaging section to start the accumulation based on the accumulation start timing output by the accumulation start timing setting section from the flash light emission start in the flash light emission section,
    the emitted light waveform information has information on a light emission strength for each of a plurality of intervals, and
    the accumulation start timing setting section calculates, based on the emitted light waveform information, a light emission amount obtained by accumulating the light emission strength for each of the intervals which correspond to a period within the accumulation time when setting the accumulation time in association with the light emission time in the flash light emission section, and sets the timing of accumulation start so that a sum total of the light emission amounts calculated for each of the intervals within the accumulation time is the same as the received light amount
    wherein
    the accumulation start timing setting section selects any of the plurality of intervals, and calculates the light emission amount obtained by accumulating the light emission strength based on light emission strength information in the interval, using a calculation formula corresponding to the selected interval.

2. The photographing apparatus according to claim 1, wherein
    the accumulation control section causes the imaging section to terminate the accumulation based on the accumulation time output by the exposure calculation section.

3. The photographing apparatus according to claim 1, further comprising in the imaging section:
    a pixel section in which pixels are arranged two-dimensionally in a matrix, the pixels including a photoelectric conversion element changing an electric charge amount to be accumulated according to incident light and an electric charge holding section holding the electric charge accumulated in the photoelectric conversion element; and
    an electric charge accumulation control section controlling the pixel section so as to cause the plurality of pixels in the pixel section to start the accumulation at the same time by an accumulation start instruction from the accumulation control section.

4. The photographing apparatus according to claim 3, wherein
    the electric charge accumulation control section controls the pixel section so as to cause the plurality of pixels in the pixel section to complete the accumulation at the same time by an accumulation completion instruction output by the accumulation control section.

5. A photographing apparatus, comprising:

an external flash light emission apparatus which is configured to be attachable to the above photographing apparatus and illuminates an object, the external flash light emission apparatus preliminarily storing emitted light waveform information showing a relationship between a light emission time and a light emission strength of flash light emission;

an imaging section accumulating photoelectric current according to a received light amount and outputting an image signal according to this accumulated photoelectric current;

an accumulation control section controlling an accumulation operation in the imaging section;

a communication section performing communication with the external flash light emission apparatus;

an exposure calculation section calculating an accumulation time in the imaging section and a reception light amount corresponding to a required light emission amount of the flash light emission in the external flash light emission apparatus by the imaging section;

an accumulation start timing setting section setting a timing of accumulation start in the imaging section from light emission start in the external flash light emission apparatus based on the emitted light waveform information obtained by the communication section through the communication with the external flash light emission apparatus and the reception light amount corresponding to a required light emission amount of the flash light emission output by the exposure calculation section, wherein the accumulation control section instructs the external flash light emission apparatus via the communication section to start the flash light emission and also causes the imaging section to start the accumulation based on the accumulation start timing output by the accumulation start timing setting section from the flash light emission start in the external flash light emission apparatus, the emitted light waveform information has information on a light emission strength for each of a plurality of intervals, and the accumulation start timing setting section calculates, based on the emitted light waveform information, a light emission amount obtained by accumulating the light emission strength for each of the intervals which correspond to a period within the accumulation time when setting the accumulation time in association with the light emission time in the flash light emission section, and sets the timing of accumulation start so that a sum total of the light emission amounts calculated for each of the intervals within the accumulation time is the same as the received light amount, wherein the accumulation start timing setting section selects any of the plurality of intervals, and calculates the light emission amount obtained by accumulating the light emission strength based on light emission strength information in the interval, using a calculation formula corresponding to the selected interval.

6. The photographing apparatus according to claim 5, wherein the accumulation control section causes the imaging section to complete the accumulation based on the accumulation time output by the exposure calculation section.

7. The photographing apparatus according to claim 5, further comprising in the imaging section:

a pixel section in which pixels are arranged two-dimensionally in a matrix, the pixel including a photoelectric conversion element changing an electric charge amount to be accumulated according to incident light and an electric charge holding section holding the electric charge accumulated in the photoelectric conversion element; and an electric charge accumulation control section controlling the pixel section so as to cause the plurality of pixels in the pixel section to start the accumulation at the same time by an accumulation start instruction from the accumulation control section.

8. The photographing apparatus according to claim 7, wherein the electric charge accumulation control section controls the pixel section so as to cause the plurality of pixels in the pixel section to complete the accumulation at the same time by an accumulation completion instruction output by the accumulation control section.

* * * * *